(12) United States Patent
Proulx

(10) Patent No.: US 7,882,642 B2
(45) Date of Patent: *Feb. 8, 2011

(54) TRIMMER HEAD FOR USE IN FLEXIBLE LINE ROTARY TRIMMERS HAVING IMPROVED LINE LOADING MECHANISM

(75) Inventor: Richard A. Proulx, Alta Loma, CA (US)

(73) Assignee: Proulx Manufacturing, Inc., Rancho Cucamonga, CA (US)

( * ) Notice: Subject to any disclaimer, the term of this patent is extended or adjusted under 35 U.S.C. 154(b) by 670 days.

This patent is subject to a terminal disclaimer.

(21) Appl. No.: 11/833,085

(22) Filed: Aug. 2, 2007

(65) Prior Publication Data

US 2008/0052917 A1   Mar. 6, 2008

Related U.S. Application Data

(60) Provisional application No. 60/824,404, filed on Sep. 1, 2006.

(51) Int. Cl.
  *A01G 3/06* (2006.01)
(52) U.S. Cl. .......................................... 30/276; 56/295
(58) Field of Classification Search ................... 30/276, 30/347; 56/12.7, 295
  See application file for complete search history.

(56) References Cited

U.S. PATENT DOCUMENTS

| | | |
|---|---|---|
| 4,458,419 A | 7/1984 | Proulx |
| 4,959,904 A | 10/1990 | Proulx |
| 5,743,019 A * | 4/1998 | Berfield ........................ 30/276 |
| 5,765,287 A | 6/1998 | Griffini et al. |
| 6,148,523 A | 11/2000 | Everts et al. |
| 6,263,580 B1 | 7/2001 | Stark et al. |
| 6,854,185 B1 | 2/2005 | Alliss |
| 6,901,667 B2 | 6/2005 | Proulx |
| 6,952,877 B2 | 10/2005 | Pfaltzgraff |
| 7,607,232 B2 * | 10/2009 | Pfaltzgraff .................... 30/276 |
| 7,640,668 B2 * | 1/2010 | Iacona .......................... 30/276 |
| 2002/0189107 A1 * | 12/2002 | Arnetoli ....................... 30/276 |
| 2005/0076515 A1 | 4/2005 | Proulx |

* cited by examiner

*Primary Examiner*—Stephen Choi
(74) *Attorney, Agent, or Firm*—Holland & Knight LLP; Richard E. Lyon, Jr.

(57) ABSTRACT

A trimmer head for use with a length of flexible cutting line in a rotary trimmer comprising a housing operatively connected to the trimmer to effect rotation of the head and a spool for carrying the cutting line thereon. The spool is operatively connected to the housing for rotation therewith and defines a line receptor channel having opposed open ends and traversing the spool. The channel can be aligned with the eyelets in the housing skirt such that cutting line can be inserted therethrough and wrapped about the spool upon relative rotation of the spool and housing without having to interrupt the operative connection therebetween. A central portion of the channel intermediary its open ends is exposed to provide access to the portion of line therein so that line wound about the spool can be pulled from the head without having to interrupt the operative connection therebetween.

37 Claims, 17 Drawing Sheets

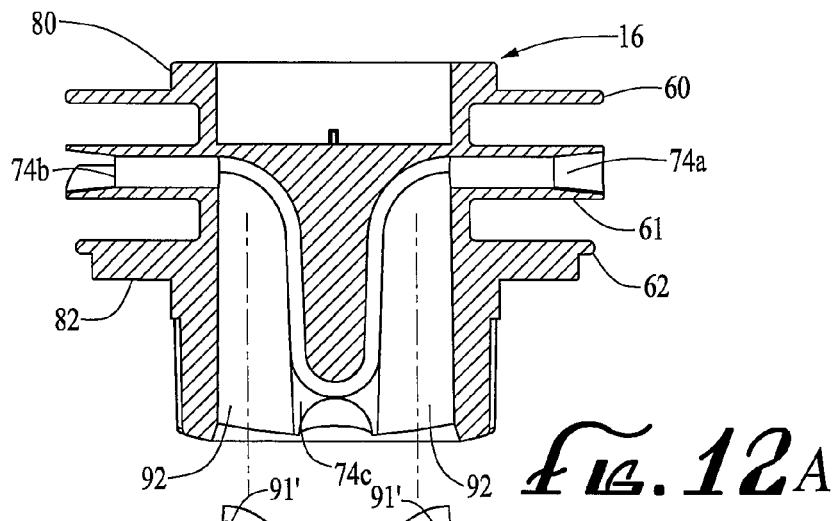
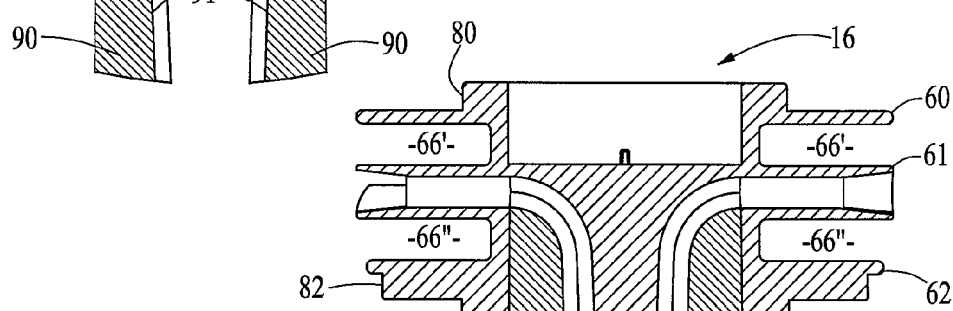
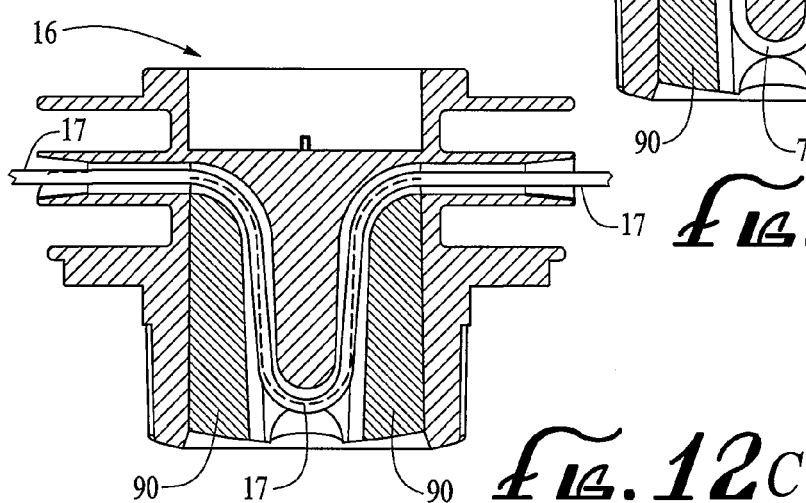
FIG. 12A
FIG. 12B
FIG. 12C

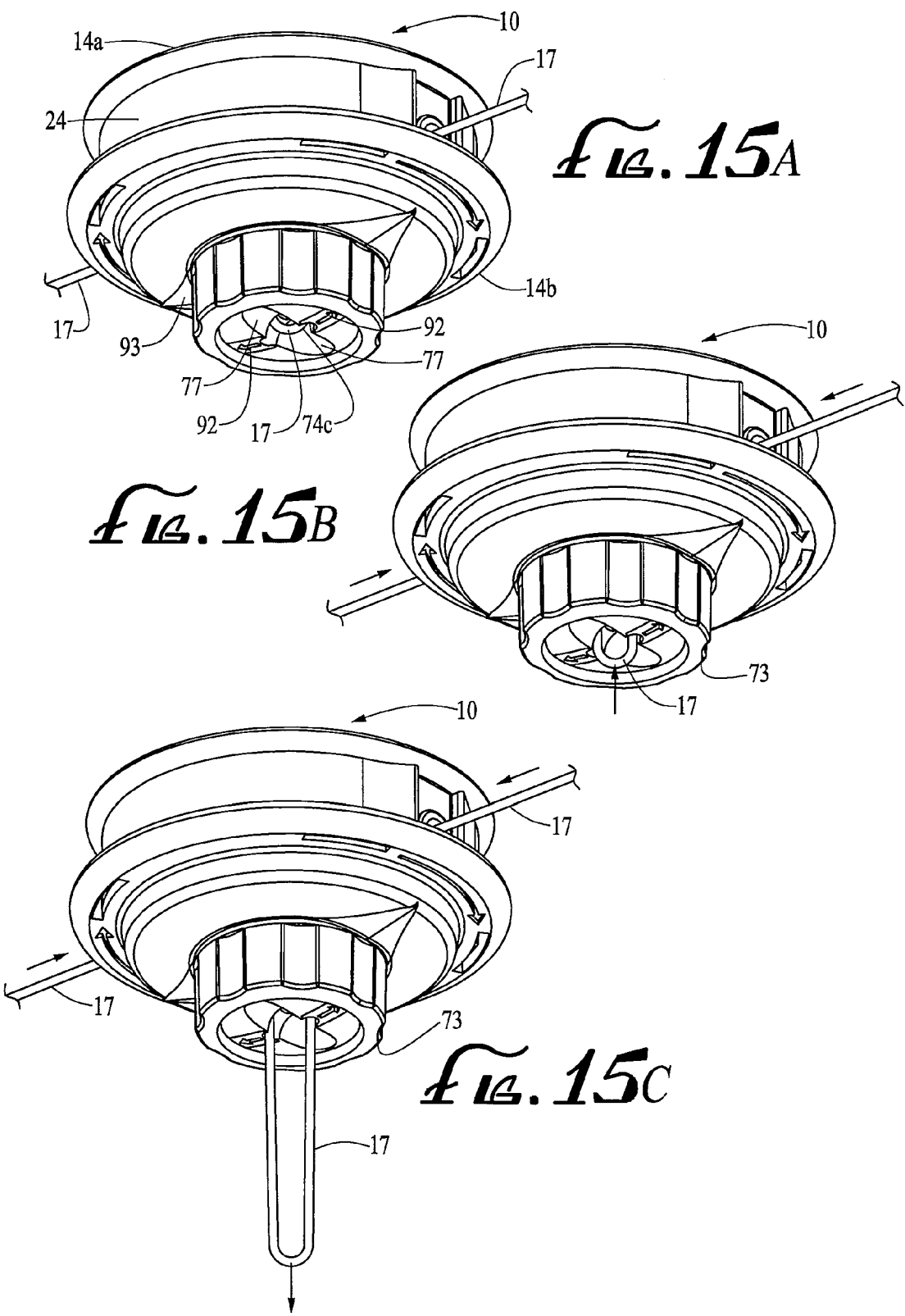

TRIMMER HEAD FOR USE IN FLEXIBLE LINE ROTARY TRIMMERS HAVING IMPROVED LINE LOADING MECHANISM

CROSS-REFERENCE TO RELATED APPLICATIONS

This application claims the benefit of U.S. Provisional Patent Application Ser. No. 60/824,404, filed Sep. 1, 2006, entitled "Trimmer Head for Use in Flexible Line Rotary Trimmers Having Improved Line Loading Mechanism".

BACKGROUND OF THE INVENTION

The present invention relates to an improved trimmer head for use in flexible line rotary trimming devices used to trim grass, weeds and other vegetation. More particularly, the invention is directed to an improvement in the line loading of both "bump-feed" type trimmer heads such as those disclosed in U.S. Pat. Nos. 4,458,419, 4,959,904 and 6,901,667 and the more simple manually operated heads such as that disclosed in pending Application Pub. No. U.S. 2005/0076515 A1, filed Sep. 3, 2004. With minor modifications to accommodate the differences in the configurations of spool and housing, the improvement of the present invention could also be embodied in automatic heads of the type such as that disclosed in U.S. Pat. No. 5,063,673.

Trimmer heads used in flexible line rotary trimmers generally carry one or two lengths of flexible nylon cutting line wrapped about an interior spool with the ends of the line or lines projecting outwardly through opposed apertures in the side wall of the trimmer head. The head is threadably mounted on the end of an elongated shaft and rotated at a high velocity by a gas or electric motor so that the ends of the cutting line project radially from the head and sever weeds or other vegetation. When cutting line projecting from the head breaks off or becomes overly worn, it must be severed and fresh line extended from the spool through the line outlet eyelets in the side of the housing. Bump-feed type heads include a line feed-out mechanism which responds to a bump on the ground intentionally applied by the operator to feed out a measured length of fresh cutting line which is typically cut to the desired length by a knife blade projecting from a shield attached to the trimmer above the cutting head and spaced a predetermined distance from the perimeter of the trimmer head housing. Manual heads do not include any such line feed-out mechanism. The spool must be manually rotated relative to the housing to pay out additional cutting line. Automatic heads include a mechanism that detects a loss of mass in the cutting line projecting from the head during use and, without the need for any action by the operator, pay out additional lengths of line from the spool through the eyelets.

In each of these types of heads, the length or lengths of cutting line are typically wound onto the spool by hand. As most cutting heads employ a single length of line wrapped about a spool with the end portions projecting from opposed sides of the cutting head, care must be taken during the winding of the spool to avoid crossing or otherwise tangling of the line within the spool which interferes with the paying out of fresh line. This is particularly important in automatic and bump-feed heads where centrifugal force is utilized to pull the new lengths of line from the spool during use as the head is being bumped against the ground as any line tangle will interfere with the proper feeding of the line. Difficulty in properly loading the line on the spool is the most common complaint of home users of flexible line trimmers. It also is a time consuming task for the professional user.

An example of a bump-feed head is found in U.S. Pat. No. 4,458,419, the contents of which are incorporated herein by reference as though fully set forth below. As described therein in detail, the trimmer head contains a spool holding one or more coils of cutting line and a simplified mechanism that selectively allows relative movement of the spool with respect to the housing in response to bumping of the head on the ground to pay out measured lengths of line. The simplified pay-out mechanism includes a spring-loaded cam and cam follower arrangement in which the cam follower includes two pairs of diametrically opposed and generally inwardly facing abutment surfaces arrayed about the axis of rotation of the trimmer housing. The abutment surfaces are spaced 90° apart and are carried by a depending cylindrical wall that circumscribes an interior chamber. The cam member is disposed within the chamber in threaded engagement with the extended lower end of the drive bolt of the trimmer housing and defines two vertically adjacent cams, each cam being of a square configuration and defining four perpendicularly disposed cam surfaces adapted to engage the abutment surfaces on the cam follower. The upper cam was rotationally offset 45° from the lower cam.

In operation, the housing is rotationally driven by the drive bolt through a connection between the upper end of the bolt and the trimmer drive means. The cam member is attached to the housing and thus is also driven by the drive bolt. The cam member in turn drives the cam follower and the spool that is mounted thereon due to the operative engagement between the cam surfaces on the cam member and the abutment surfaces on the cam follower. The line carrying spool is disposed about the cylindrical wall of the cam follower and is attached thereto via a pair of opposed outwardly projecting studs on the cam follower member that extend into slots formed in the inner portion of the spool. The spool is provided with a bumper at its lower end such that when the bumper is pressed against or bumped on the ground, the housing moves downwardly with respect to the spool against the force of a spring, disengaging the lower cam from the abutment surfaces on the cam follower and allowing the cam member to rotate 45° relative to the cam follower, whereupon the cam surfaces of the upper cam abut the abutment surfaces on the cam follower. That imparts a similar degree of relative rotation between the spool and the housing. Once the force of the bump is dissipated, the spring loading forces the spool and housing back to their relative positions, which releases the cam surfaces on the upper cam from the cain follower abutment surfaces and allows another 45° of relative rotation of the cam member and cam follower and thus of the spool and housing, for a total of 90° of rotation per bump, which provides the predetermined relative rotation between the housing and spool needed to pay out a desired length of line through the apertures in the trimmer housing. Other examples of bump-feed type trimmer heads are found in U.S. Pat. Nos. 4,959,904 and 6,901,667, the contents of which are also incorporated herein by reference as though fully set forth below.

In many of these trimmer heads, it is necessary to separate the spool from the housing to wind the cutting line about the spool. Various channel configurations in and through the spool have been developed that enable the line to be fed onto the spool through the eyelets in the housing without having to first remove the spool from the housing. Examples of such heads are found in U.S. Pat. Nos. 5,765,287 and 6,263,580 and in Applicant's pending patent application, Pub. No. U.S. 2005/0076515 A1, filed Sep. 3, 2004 and entitled "Trimmer Head For Use in Flexible Line Rotary Trimmers Having Improved Line Loading Mechanism", said published application being incorporated herein by reference as though fully set forth herein. While these configurations do facilitate the loading of line onto the spool, they do not eliminate the need to remove the spool from the housing (known in the trade as splitting the head) in the event the cutting line breaks proximate the eyelet during use. Unfortunately, this is a frequent occurrence when the rapidly rotating line strikes a solid object such as a fence post. When such breakage occurs, the load pulling outwardly on the line during use is effectively eliminated and the line recoils, drawing the severed end of the line inwardly through the housing eyelet. Fresh line can no longer be paid out through the eyelets without first splitting the head to gain access to the spool in order to unwind fresh line from the spool and thread the fresh line through the eyelet in the housing. The trimmer heads of the present invention enable the user to quickly and easily uniformly wind lengths of cutting line onto the spool and to remove and reload line on the spool without having to split the head even in those instances where line breakage occurs proximate the housing eyelet during use.

SUMMARY OF THE INVENTION

Briefly, the present invention comprises an improved rotary trimmer head configured to facilitate loading of the cutting line onto the trimmer spool and removal of the line from the spool, both without having to interrupt the operative connection between the spool and the housing. To provide such loading and unloading of the line, the spool is provided with a line receptor channel that traverses the spool and has geometrically opposed open ends through which the cutting line can enter and exit the spool. At least a transverse portion of the channel that is intermediary of its opposed ends, is open and exposed such that the portion of the cutting line passing therethrough is accessible to the user when the spool is operatively connected to the trimmer head housing.

Winding of the cutting line onto the spool is achieved by first aligning the spool with the trimmer head housing to which it is operatively connected such that the opposed open ends of the line receptor channel are radially aligned with the eyelets and/or openings in the surrounding housing sidewall. In the preferred embodiments of the invention, an end portion of the line can be directed through one of the openings in the housing wall and into the aligned line receptor channel. The line passes through a portion of the spool and exits the channel adjacent one side of the open intermediary portion of the channel. The end portion of the line is then directed back into the receptor channel on the opposite side of the open intermediary portion thereof and is extended through the remainder of the channel in the spool and out the other aligned opening in the housing sidewall. The line is then pulled through the trimmer head until approximately half of the total length of the line is protruding from each side of the trimmer head with a central portion of the line being disposed in the open intermediary portion of the line receptor channel. Alternatively, the two extended end portions of the cutting line can be inserted into and directed through the portions of the receptor channel disposed on the opposite sides of the open intermediary portion thereof. Each end portion of the cutting line is then pulled through one of the opposed pairs of openings in the spool and housing wall until again, approximately half of the total length of line is protruding from each side of the trimmer head and a central portion of the line is positioned in the open intermediary portion of the line receptor channel. Subsequent rotation of the spool relative to the housing will wind the cutting line about the spool.

To provide an even winding and distribution of the protruding cutting line about the spool and prevent tangling within the spool during winding, a cam and cam follower mechanism is provided in the operative connection between the spool and housing to cause the spool to translate upwardly and downwardly with respect to the housing when the spool is gripped by the lower body portion of the spool and rotated in a given direction relative to the housing. This reciprocating movement of the rotating spool with respect to the housing provides for an even distribution of the cutting line about the spool as the line is wound thereon. To remove the line from the head, the user need only grip the exposed portion of the line in the open portion of the line receptor channel and pull that portion of the line in a direction away from the spool and substantially parallel to the axis of rotation of the spool, whereupon the line will simply unravel from the spool and separate from the head.

BRIEF DESCRIPTION OF THE DRAWINGS

FIG. 12A is a cross-sectional exploded view of the spool of the trimmer head shown in FIGS. 1-6C as viewed along the line 12A-12A in FIG. 10 but prior to the insertion of the channel-forming inserts to illustrate an economical method of forming the spool.

FIG. 12B is a cross-sectional view of the spool of the trimmer head shown in FIGS. 1-6C and is taken along the line 12A-12A in FIG. 10 illustrating the spool with the channel-forming inserts installed.

FIG. 12C is a cross-sectional view of the spool of the trimmer head shown in FIGS. 1-6C and is taken along the line 12A-12A in FIG. 10 illustrating the spool with the channel-forming inserts installed and with the cutting line extending through the line receptor channel in the spool.

FIG. 15A is a perspective view of the trimmer head shown in FIGS. 1-6C as seen from below and with the cutting line loaded thereon.

FIG. 15B is a perspective view of the trimmer head shown in FIGS. 1-6C as seen from below and illustrating the cutting line as it begins to be withdrawn from the lower open portion of the line receptor channel.

FIG. 15C is a perspective view of the trimmer head shown in FIGS. 1-6C as seen from below and illustrating the cutting line as it further withdrawn from the lower open portion of the line receptor channel.

DETAILED DESCRIPTION OF THE PREFERRED EMBODIMENTS

Figure 1:
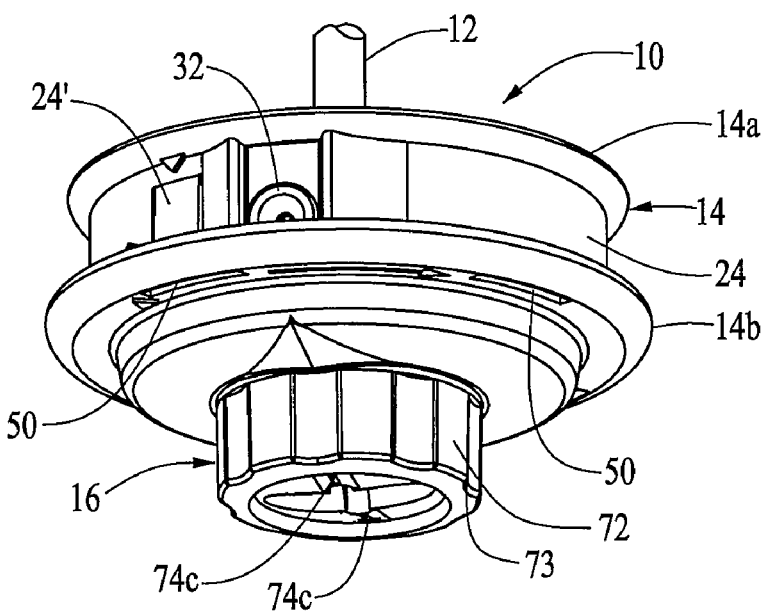
FIG. 1 is a perspective view of a first embodiment of the trimmer head of the present invention as seen from below.
Figure 2:
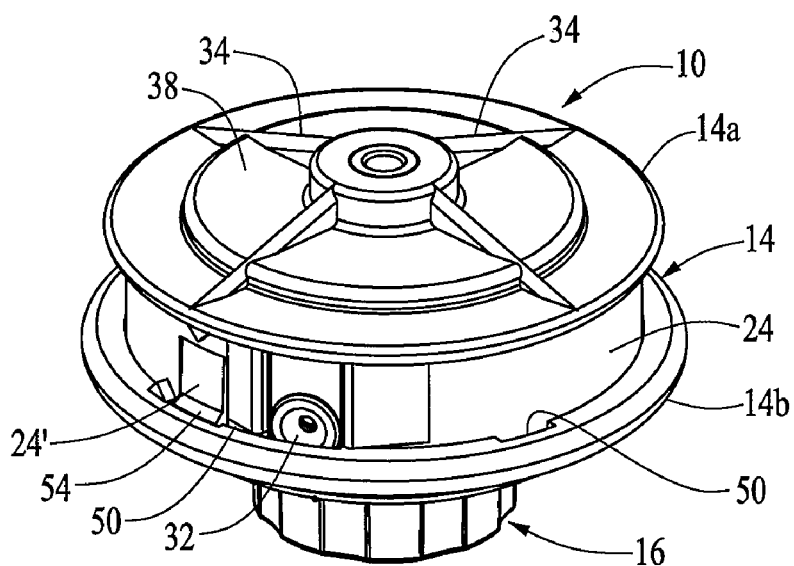
FIG. 2 is a perspective view of the embodiment of the trimmer head illustrated in FIG. 1 as seen from above.

Referring now in detail to the drawings, a first embodiment of a bump-feed type trimmer head 10 of the present invention is shown in FIGS. 1-15 and 20. The trimmer head 10 of the present invention shown therein is designed to be mounted on the extended end of a rotatable drive shaft 12 on a gasoline or electric powered rotary trimmer (not shown). The trimmer head 10 shown therein is a bump-feed type head having the drive and line feeding mechanism disclosed in U.S. Pat. No. 4,959,904 but including the rapid line loading and replacement feature of the present invention.

Trimmer head 10 comprises a housing 14, spool 16, coil spring 18 and drive bolt 20. The housing comprises an upper portion 14a and a lower portion 14b that are releasably secured together about the spool. The trimmer head housing and spool are preferably formed by injection molding a nylon 6 copolymer. The upper housing 14a defines an upper circular wall 22, a cylindrical housing skirt 24 depending therefrom and a centrally disposed tubular extension 26. Extension 26 is axially aligned with the central axis of rotation of the head and includes a hexagonal lower portion 26a and an upwardly projecting portion 26b. The tubular extension 26 is configured to receive the drive bolt 20 with the upper portion 20a of the bolt being cylindrical in cross section and the lower portion 20b being hexagonal in cross section to mate with the hexagonal lower portion 26a of the tubular extension. The lower portion of the drive bolt and the tubular extension in the housing could also be square or otherwise configured to provide the desired interference fit between the drive bolt and housing. The drive bolt 20 is secured within the tubular extension 26 by heat shrinking the extension 26 about the bolt. An annular groove 20c is provided about the drive bolt to create an interference fit between the bolt and housing upon the shrinkage of the plastic housing material, to enhance the securement of the bolt to the housing. Other means for securing the drive bolt to the housing also could be employed. The drive bolt 20 may define an internally threaded cylindrical bore 20d extending axially therethrough for threaded engagement with the drive shaft of the trimmer.

The upper portion of housing 14 also defines a pair of opposed slots 30 in the depending cylindrical housing skirt 24. The slots 30 are open at their lower ends and are adapted to receive a pair of opposed metal outlet eyelets 32 in a press fitment. Alternatively, the eyelets could be press fit through apertures in the housing skirt. Portions of the housing skirt 24 adjacent the eyelets are preferably raised or ramped outwardly to protect the eyelets from foreign objects during use. A plurality of radially projecting heat dissipation ribs 34 are formed on the upper circular wall 22 of the upper housing 14a. A plurality of equiangularly disposed and outwardly projecting radial tabs 36 also are provided at the lower end of the cylindrical housing skirt 24 for the securement of the lower housing portion 14b to the upper portion 14a as will be described.

Figure 7:
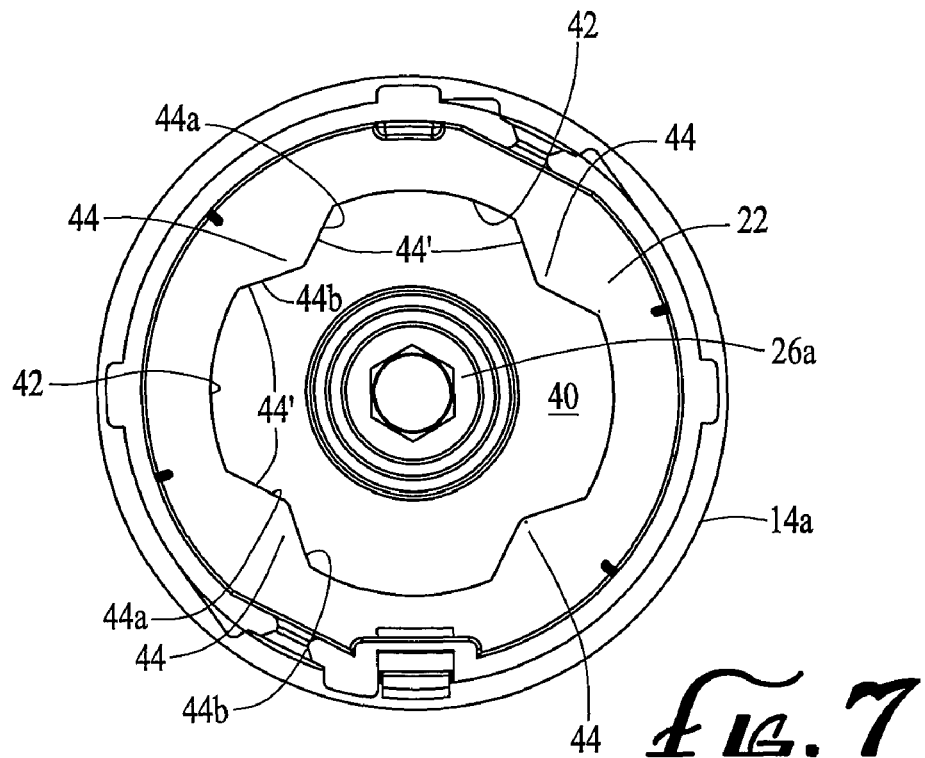
FIG. 7 is a bottom plan view of the interior of the upper portion of the housing of the trimmer head shown in FIGS. 1-6C.

The upper circular wall 22 of the trimmer head housing 14 has a raised central portion 38 so as to define an interior recessed area 40 therein. As shown in FIG. 7, the perimeter wall surface 42 extending about the recessed area 40 defines four equiangularly disposed projections 44 that project radially inwardly from wall surface 42. Each of the projections defines a pair of angularly disposed surfaces 44' that offset by 135° and are parallel to the axis of rotation of the head. These projections define cam surfaces.

The leading surface on each of the projections 44 defines an upper cam 44a (counterclockwise rotation as seen from above). The trailing surfaces each define an upper slide surface 44b. The surface of each of the cams is again parallel to the axis of rotation of the head. The upper slide surfaces 44b may be downwardly inclined, preferably radiused, particularly on smaller sized heads, to facilitate line loading as will be discussed.

Figure 4:
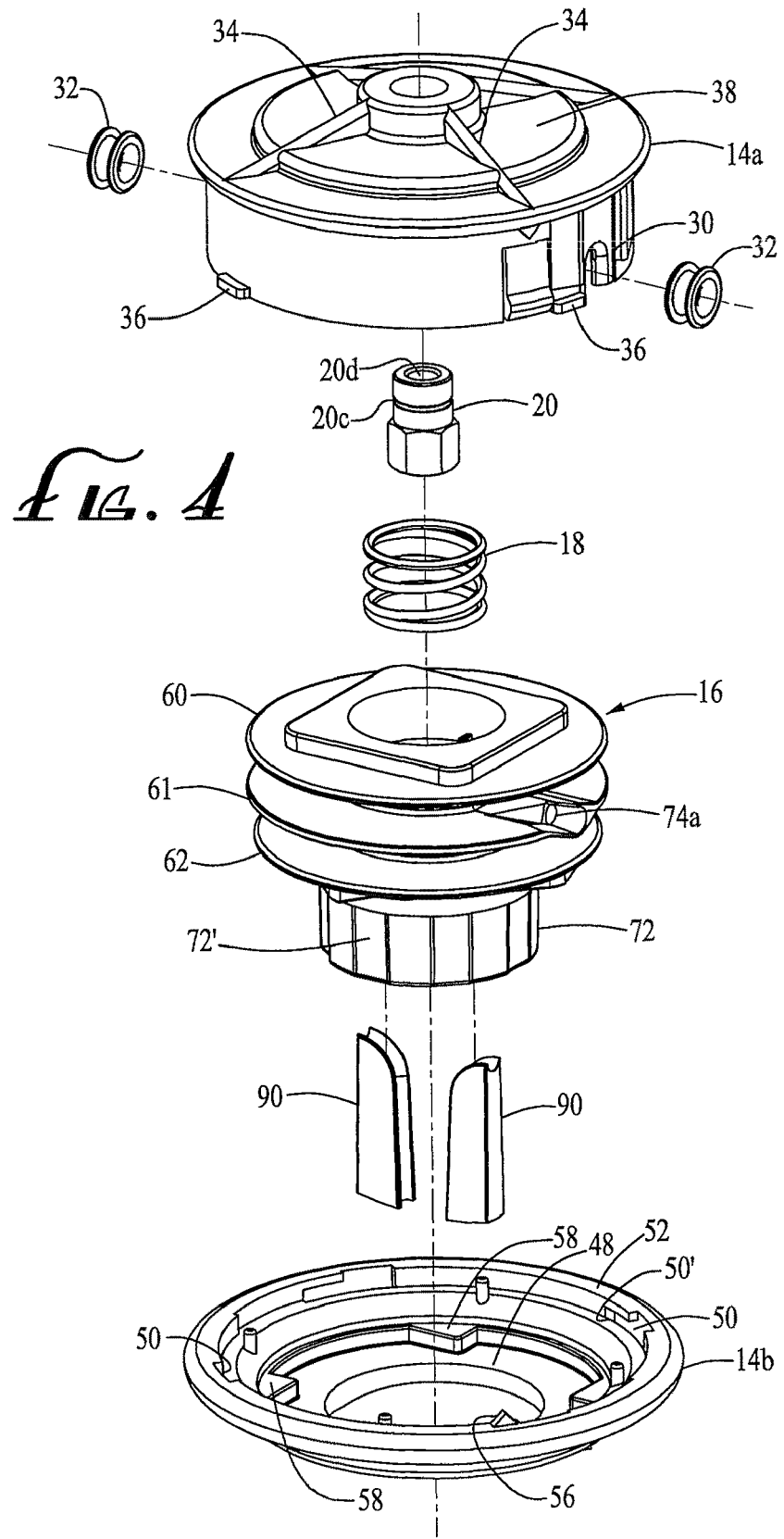
FIG. 4 is an exploded perspective view of the various elements comprising the first embodiment of the trimmer head similar to FIG. 3 but as viewed from above.

The lower housing portion 14b of the trimmer head 10 defines an enlarged circular opening 46 in the underside thereof, an annular horizontal surface 48 disposed about opening 46, and a plurality of equiangularly disposed slots 50 (four being shown) adjacent the upper surface 52 of the lower housing portion 14b for receiving a corresponding number of locking tabs 36 on the upper housing portion 14a. Slots 50 are provided with narrow offset portions 50' as seen in FIG. 4. To attach the upper housing portion 14a with the lower housing portion 14b, the user first inserts the four rigid locking tabs 36 of the upper housing portion 14a into four of the slots 50 in the lower housing portion 14b. Resilient cantilevered portion 24' of the housing skirt 24 defines a tab 54 that will be simultaneously pressed radially inward by the protrusion 56 in the lower housing portion 14b as the upper housing portion 14a and the lower housing portion 14b are mated. The user then rotates the upper housing portion 14a counterclockwise with regard to the lower portion 14b, causing the locking tabs 36 to translate into the offset portions 50' of the slots 50. When the locking tabs 36 have translated completely into the offset portions 50', the protrusion 56 will no longer be in contact with the tab 54 and the cantilevered portion 24' will return to its original, unstressed position. In this configuration, protrusion 56 can prevent the upper housing portion 14a from translating clockwise and the upper housing portion 14a can be securely attached to the lower housing portion 14b.

Figure 8:
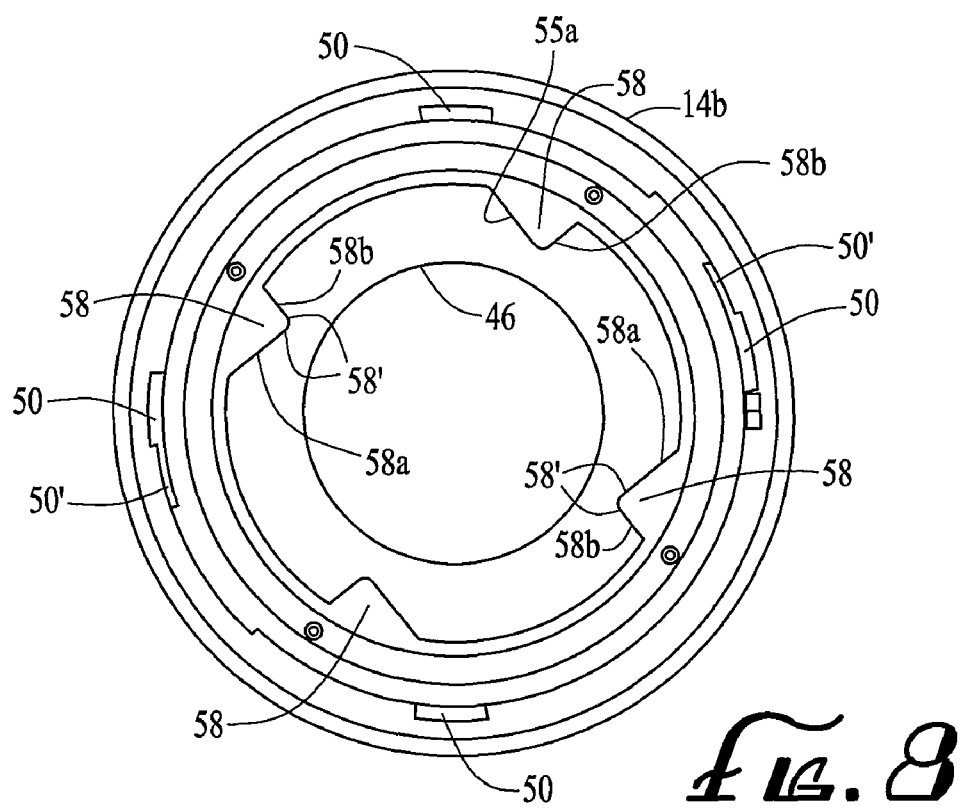
FIG. 8 is a top plan view of the interior of the lower portion of the housing of the trimmer head shown in FIGS. 1-6C.
Figure 9:
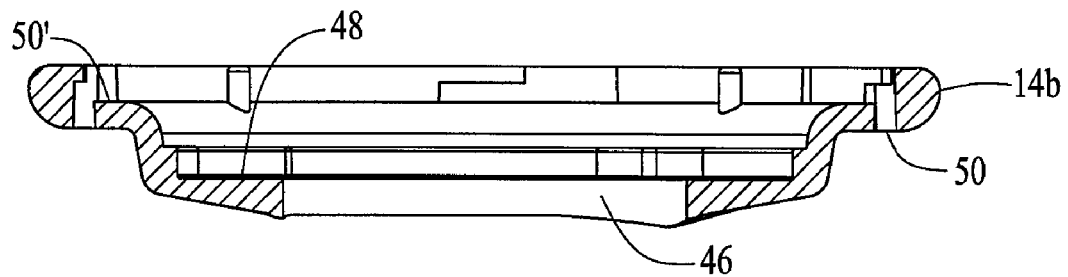
FIG. 9 is a cross-sectional view of the lower portion of the housing of the trimmer head taken along the line 9-9 in FIG. 8.

The lower housing portion 14b further defines four equiangularly disposed projections 58 on the annular surface 48 adjacent opening 46 as seen in FIG. 8. The angularly disposed surfaces 58' on projections 58, like the surfaces 44' in the projections 44 in the upper housing portion 14a, define angularly disposed lower cams 58a and lower slide surfaces 58b. The lower cams 58a are on the leading surfaces of the projections, extend parallel to the axis of rotation of the cutting head and again can be angled at 135° with respect to the adjacent slide surfaces. The slide surfaces 58b can be radiused upwardly. In a preferred embodiment, however, the slide surfaces 58b on the lower projections 58 are not angled at 135° with respect to the cam surfaces 58a but at a lesser angle as seen in FIG. 8 to accommodate a preferred ramping configuration on the leading sides of the lower cam follower which is defined by the spool as will be described.

Figure 5:
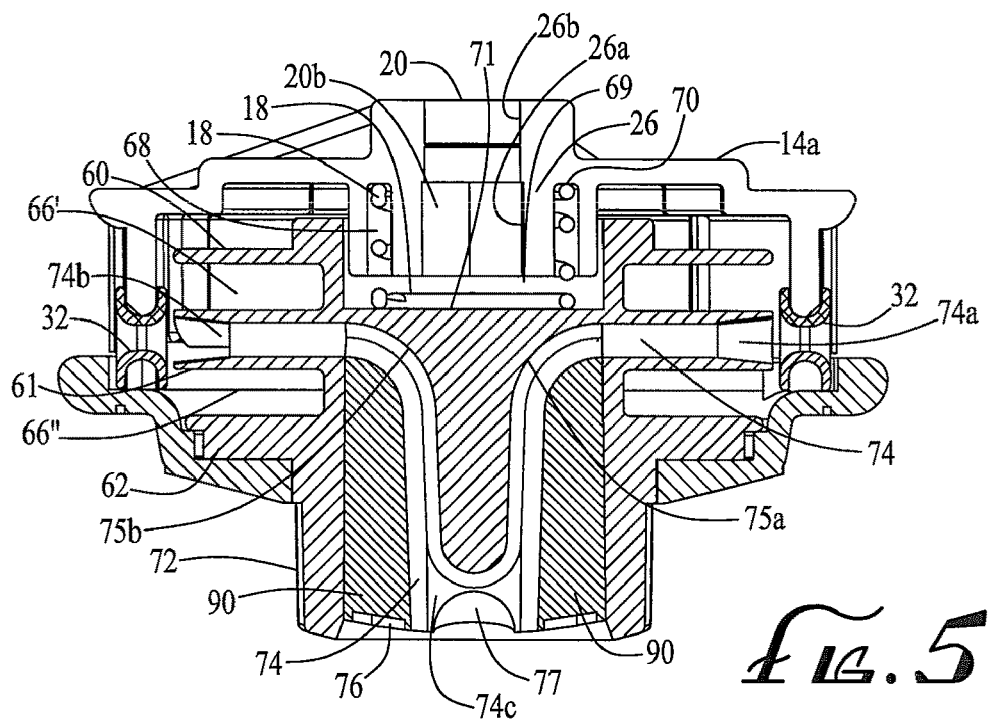
FIG. 5 is a sectional view of the embodiment of the trimmer head shown in FIGS. 1-4, illustrating the spool and trimmer head housing before the cutting line is loaded.
Figure 6A:
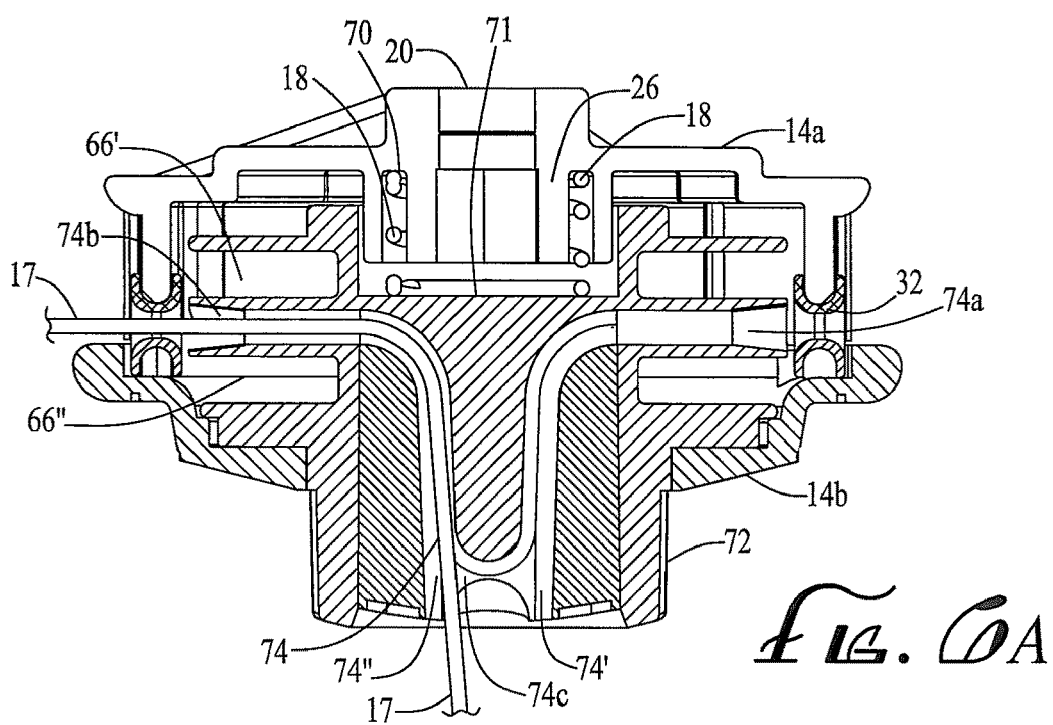
FIGS. 6A and 6B are sectional views of the trimmer head as shown in FIG. 5 illustrating the loading of the cutting line.
Figure 6B:
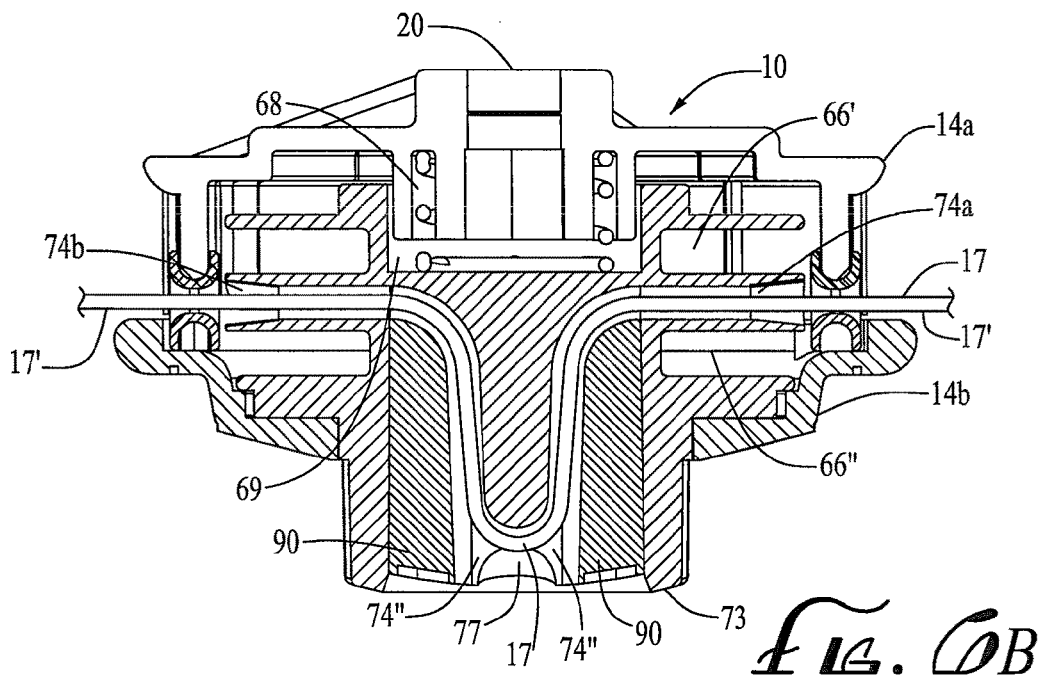
Figure 6C:
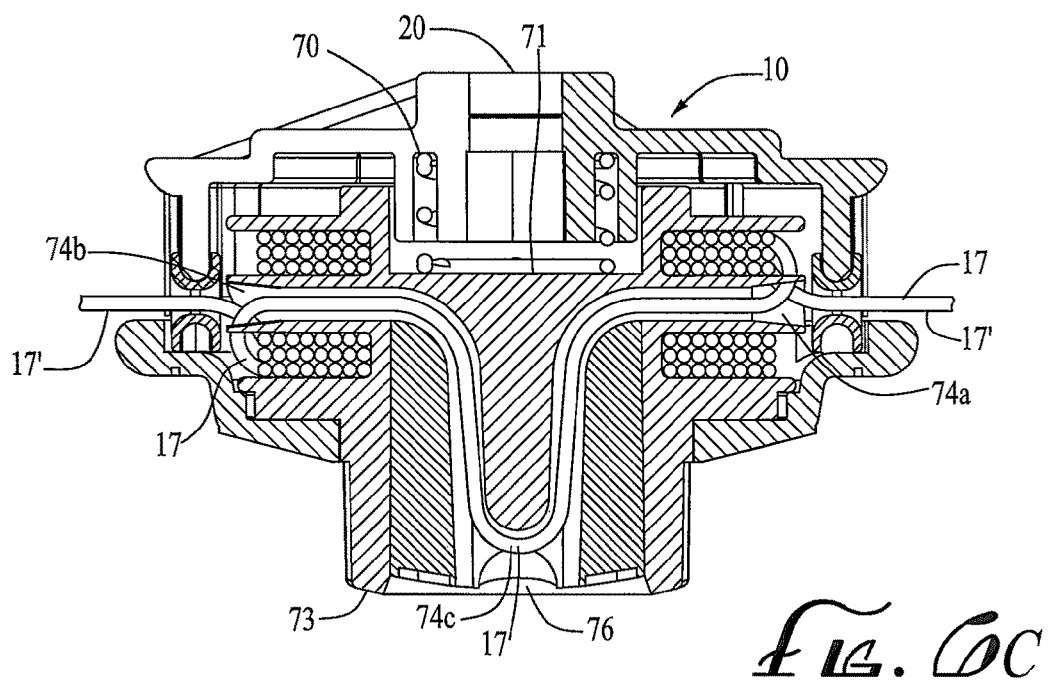
FIG. 6C is the sectional view of the trimmer head as shown in FIG. 5 with the cutting line wound thereon.

As seen, for example, in FIGS. 3-6, 11A and 11B, the spool 16 in trimmer head 10 defines an upper flange 60, a middle flange 61 and a lower flange 62 carried by a cylindrical upper body portion 64 so as to define two annular storage areas 66' and 66" between flanges 60 and 61, and between flanges 61 and 62, respectively, for carrying coils of flexible nylon cutting line 17 wrapped about body portion 64 such that upon assembly, the end portions 17' of the cutting line will extend outwardly through the outlet eyelets 32 as seen in FIG. 6C. An annular chamber 68 is provided in the interior of upper housing 14a about the lower portion 26a of tubular extension 26 and is open at its lower end. The annular chamber 68 defines an upper spring abutment surface 70. A cylindrical chamber 69 having an open upper end is disposed about the central axis of rotation in the upper end of the spool 16 and defines a lower spring abutment surface 71. When head 10 is assembled, the tubular extension 26 on the upper housing projects into chamber 69 in the spool and the coil spring 18 extends between and bears against the spring abutment surfaces 70 and 71 as seen in FIGS. 5 and 6. The lower body portion 72 of the spool 16 is provided with a knurled outer surface 72' for gripping the spool and projects through the opening 46 in the bottom of the lower housing portion 14b such that the lowermost end 73 of spool 16 can be bumped against the ground to pay out additional cutting line through the opposed eyelets 32 during use.

The lower body portion 72 of spool 16 also defines a line receptor channel 74 extending therethrough from a first open end 74a to a second opposed open end 74b and having an open accessible portion 74c therebetween. In the embodiment of the invention illustrated in FIGS. 1-15, the opposed openings 74a and 74b of the line receptor channel 74 are located in the middle flange 61 and when the spool 16 is secured within housing 14, the channel openings are radially aligned with the eyelets 32 in the skirt 24 of the upper housing 14a (see, e.g. FIGS. 5 and 6), enabling the cutting line 17 to be inserted into the line receptor channel through one of the eyelets 32 without having to remove the spool from the housing. The line receptor channel 74 extends radially inwardly from the opposed channel openings 74a and 74b through flange 61, turns downwardly at 75a and 75b in relatively wide radius curves and extends downwardly through opposed interior portions of the lower spool body portion 72, outwardly through laterally spaced openings 74' and 74" in a lower recessed area 76 of the spool and transversely across the recessed portion 76 of the spool. The portion of channel 74 extending across the lower recessed portion 76 of the spool is the open or exposed portion 74c of the channel providing access to the portion of cutting line 17 extending therethrough. Channel portion 74c preferably is defined by a concave surface or is of an inverted u-shaped configuration to assist in guiding the cutting line through the lower recessed portion 76 of the spool. Depressions 77 are provided in the lower end of the spool adjacent the open portion 74c of channel 74 to facilitate gripping the cutting line extending across the transverse portion as will be explained. At the lowermost end 73 of the spool and extending about the recessed and transversely extending open portion 74c of the line receptor channel 74 is a bumper surface 78 adapted to be pressed against the ground to effect pay out of fresh lengths of cutting line.

Figure 10:
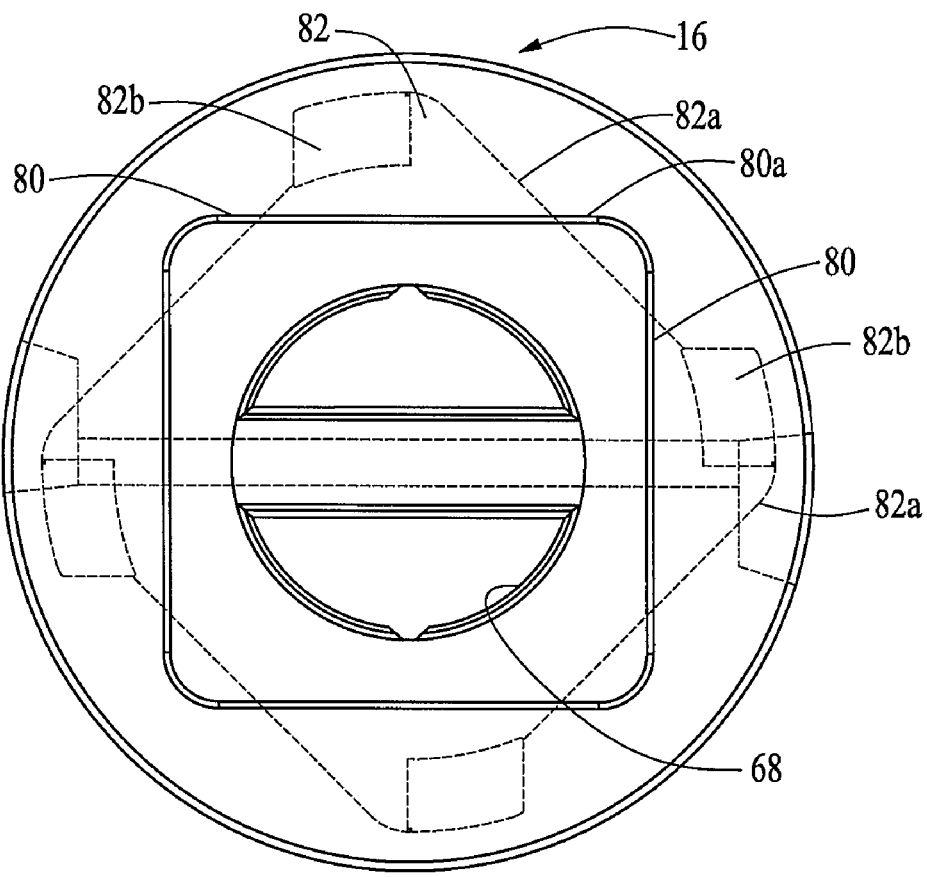
FIG. 10 is a top view of the spool of the trimmer head shown in FIGS. 1-6C showing the relative positioning of the lower cam follower with respect to the upper cam follower with the lower cam follower and line openings being shown in dotted lines.
Figure 11A:
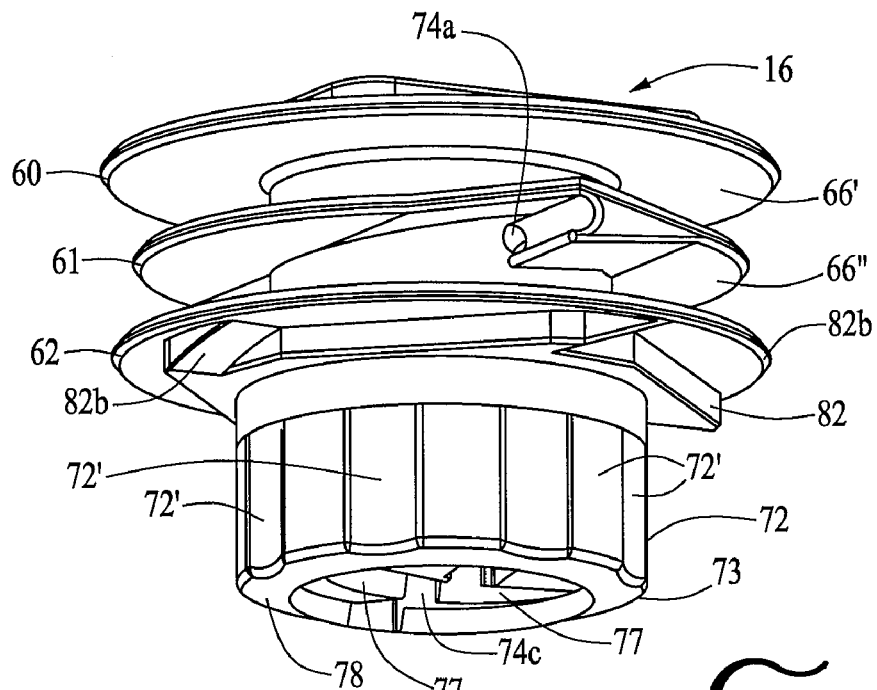
FIG. 11A is a perspective view of the spool of the trimmer head shown in FIGS. 1-6C.
Figure 11B:
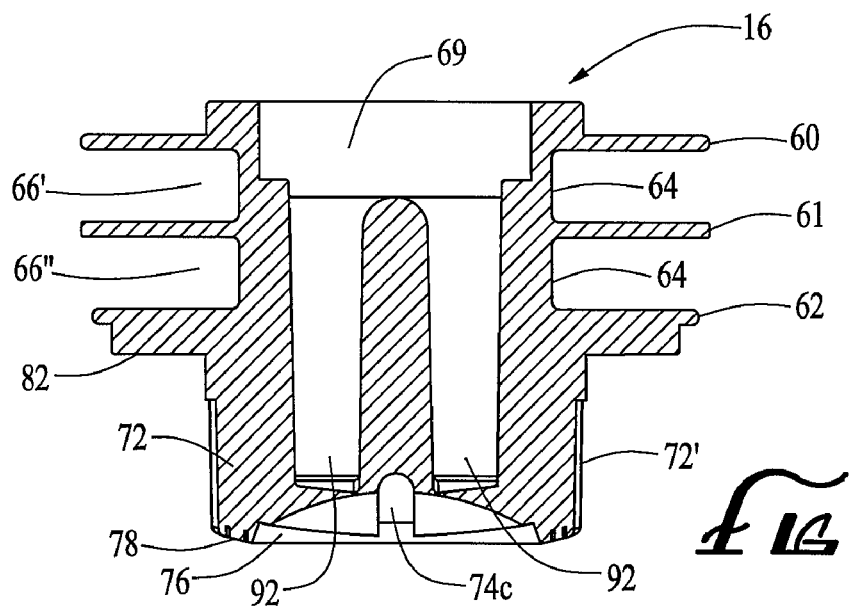
FIG. 11B is a cross-sectional view of the spool of the trimmer head shown in FIGS. 1-6C and is taken along the line 11B-11B in FIG. 10.
Figure 12D:
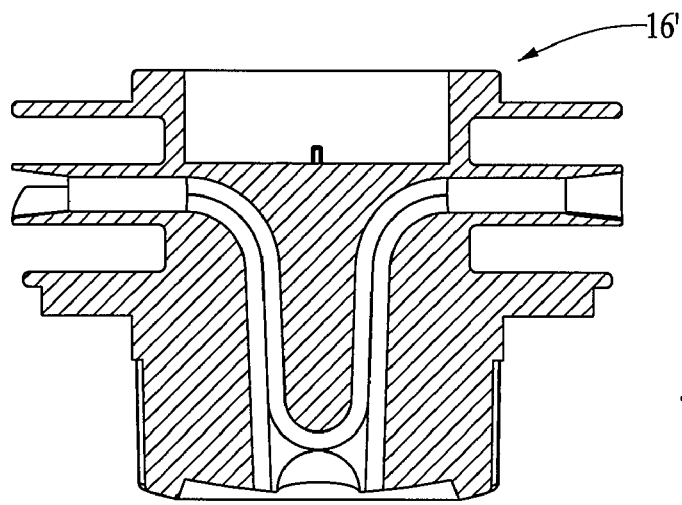
FIG. 12D is a cross-sectional view of a spool for use in the embodiment of the trimmer head shown in FIGS. 1-6C and is of single-piece construction.
Figure 13:
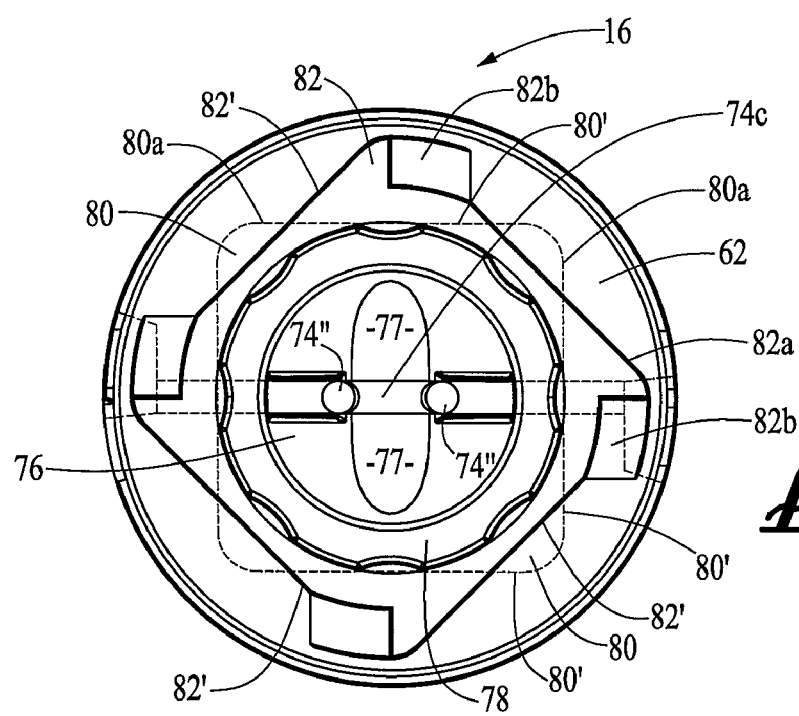
FIG. 13 is a bottom plan view of the spool of the trimmer head shown in FIGS. 1-6C showing the relative positioning of the upper cam follower with respect to the lower cam follower and with the upper cam follower and line openings being shown in dotted lines.

The upper flange 60 on spool 16 defines an upper cam follower 80 on its upper surface and the lower spool flange 62 defines a lower cam follower 82 on its lower surface as seen in FIGS. 10, 11A, and 13. While other configurations could be employed, both cam followers are preferably of a square configuration, defining four perpendicular surfaces 80' and 82' respectively, and are offset by 45° with respect to the central axis of rotation of the trimmer head. The cam abutment surfaces 80a and 82a defined by the trailing surfaces of the upper and lower cam followers are again parallel to the axis of rotation of the head. The leading surfaces of the lower cam follower which define sliding surfaces 82b may be inclined upwardly proximate the corners thereon so as to provide smoother ratcheting if needed. Also, the leading surfaces of the upper cam follower may also be inclined downwardly to facilitate line feeding. Such a downward inclination of the trailing edges is particularly preferable on the smaller heads where the length of each of the cam follower surfaces is shorter which otherwise might make the relative rotation of the spool and housing during line winding more difficult. It may also prove desirable to incline the trailing surfaces of the upper and lower cams.

Figure 3:
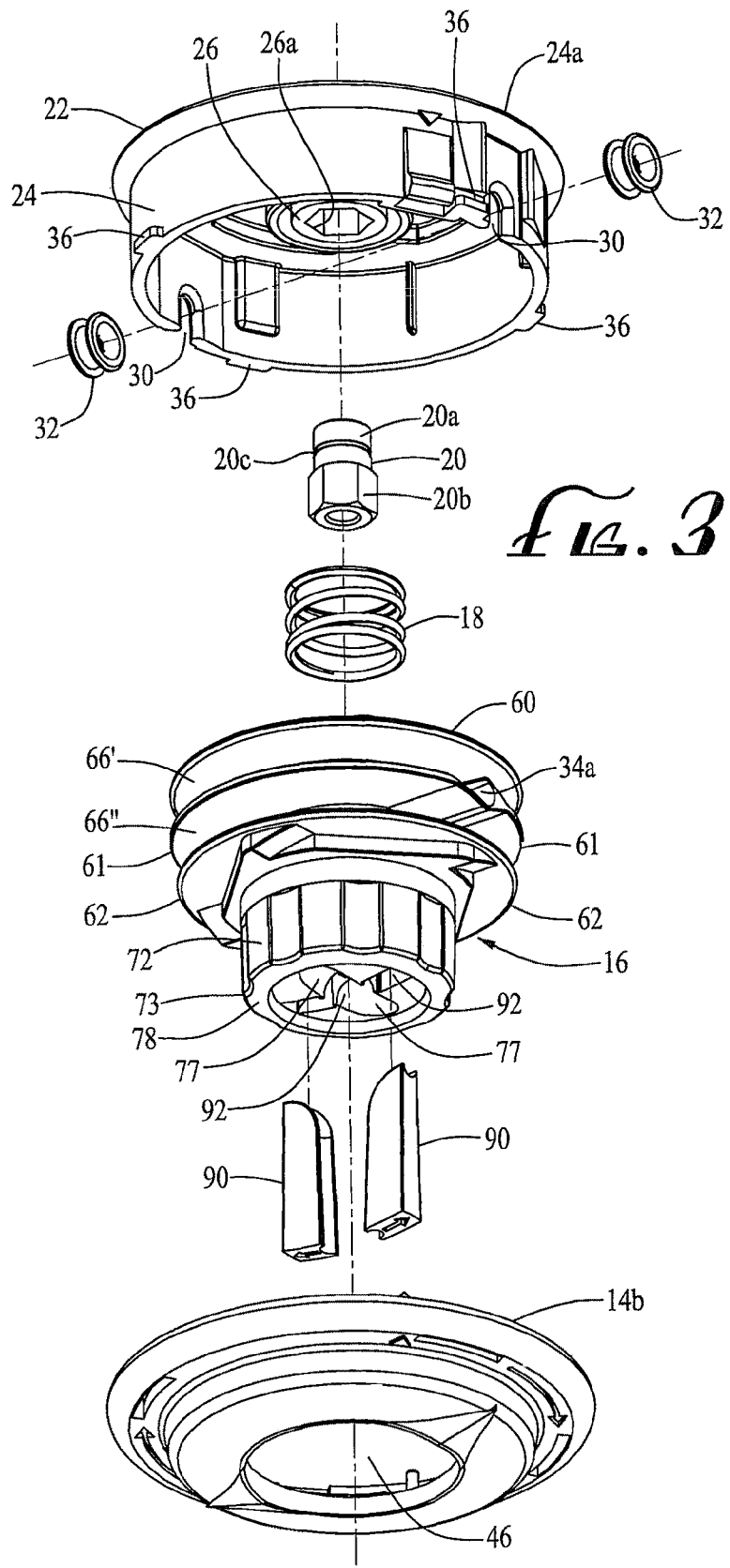
FIG. 3 is an exploded perspective view as seen from below of the various elements comprising the embodiment of the trimmer head of the present invention illustrated in FIGS. 1 and 2.

In the preferred configuration, the sliding surfaces 82b on the lower cam follower are defined by inclined ramps as seen in FIGS. 3, 10 and 13 to provide a smoother ratcheting of the spool during the winding of the cutting line thereon due to the more gradual incline than that which would be provided by radiused surfaces. As illustrated in FIGS. 7 and 8, the corresponding slide surfaces 58b on the projections 58 defined by the lower housing portion 14b are inclined inwardly more sharply than the corresponding surfaces on the projections 44 on the upper housing portion 14a to provide more space adjacent the slide surfaces on the projections 58 to accommodate these inclined ramps on projections 44 when the spool 16 translates upwardly as occurs when the trimmer head is bumped against the ground to pay out fresh line and during the manual rotation of the spool to effect the winding of the cutting line thereon.

During use, the lower cams 58a on the lower housing portion 14b are aligned with and abut the lower cam abutment surfaces on the trailing surfaces of the lower cam follower 82. Accordingly, as the housing is rotated in a counterclockwise direction by the trimmer drive, the spool is rotated with the housing. In this drive position, the upper cams 44a are upwardly spaced from upper cam follower 80 so that the driving force is generated solely by the lower cams. When the bumper surface 78 is pressed against the ground, the spool 16 is forced upwardly within the housing, disengaging the lower cam abutment surfaces 82a on the lower cam follower from the lower cams 58 and bringing the upper cam abutment surfaces 80a on the upper cam follower 80 into alignment and immediate abutment with the upper cams 44a whereupon the driving force is effected solely by the upper cams. When the bumper surface 78 is lifted from the ground, the coil spring 18 forces the spool downwardly, disengaging the upper cam follower from the upper cams and re-engaging the lower cam follower with the lower cams. With the first embodiment of the invention, with each bump on the ground effects a relative rotation of the spool and housing of 90° results, regardless of the duration of the bump. During this relative rotation, centrifugal force causes a predetermined amount of fresh cutting line to be paid out through the opposed eyelets 32 in the trimmer head housing.

To load the cutting line 17 about spool 16, the opposed open ends 74a and 74b of the receptor channel 74 are aligned with the eyelets 32 such that a single length of cutting line 17 can be inserted through one of the outlet eyelets 32 of the upper housing portion 14a and into and through the adjacent aligned open end 74a or 74b of the receptor channel 74. Printed indicia, such as arrows 92 and 93 illustrated in FIGS. 15A and 20, can be provided on the outer surface of the lower housing portion 14b and in the recessed area 76 in the lower end of the spool to facilitate proper alignment of the line receptor channel with the eyelets 32 in the housing skirt. As the cutting line is pushed into the line receptor channel 74 through, for example, open end 74b, the end portion 17' of the line passes about the curvilinear channel portion 75b and downwardly through the channel and out the opening 74" in the recessed area 76 in the lower end of the spool as illustrated in FIG. 6A. The end portion 17' of the line projecting through opening 74" can then be readily grasped and pulled downwardly, causing more of the cutting line to be drawn inwardly through the eyelet and the adjacent portion of the line receptor channel 74. The downwardly extending end portion 17' of the line is then redirected inserted back up through lower opening 74' and pushed upwardly through the remainder of the channel 74 and out through the other channel end 74a and the aligned eyelet. As the cutting line is pushed upwardly through the lower channel opening 74', it is drawn along the exposed transverse portion 74c of the channel and is directed by the surrounding channel wall outwardly through the channel 74 and to and through the adjacent eyelet to the position illustrated in FIG. 6B.

The cutting line 17 continues to be pulled through the trimmer head 10 until the midway point on the length of cutting line 17 to be loaded onto the head 10 is disposed in the open or exposed portion 74c of the line receptor channel. In this position, approximately equal lengths of line project through each of the opposed eyelets 32. Alternatively, the two end portions 17' of the length of cutting line to be loaded on the spool 16 could each be inserted through one of the separate channel openings 74' and 74" in the bottom of the spool and pushed upwardly through their respective channel portions and out through the opposed ends of the channel 74 and aligned eyelets.

Figure 14A:
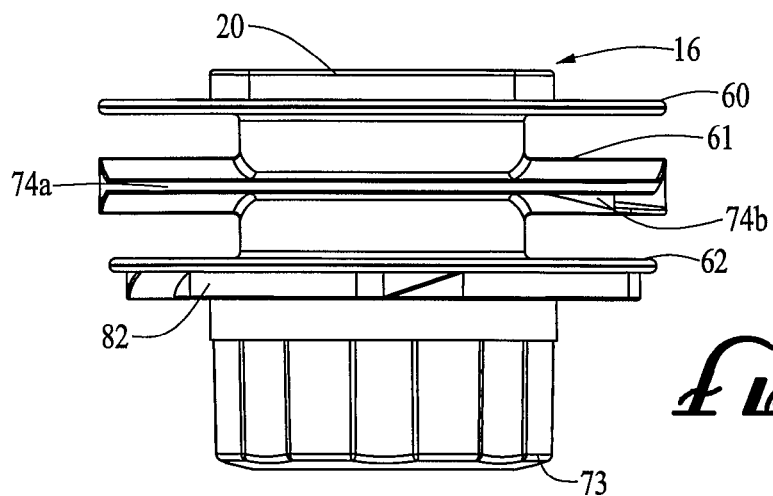
FIG. 14A is a side view of the spool of the trimmer head shown in FIGS. 1-6C.
Figure 14B:
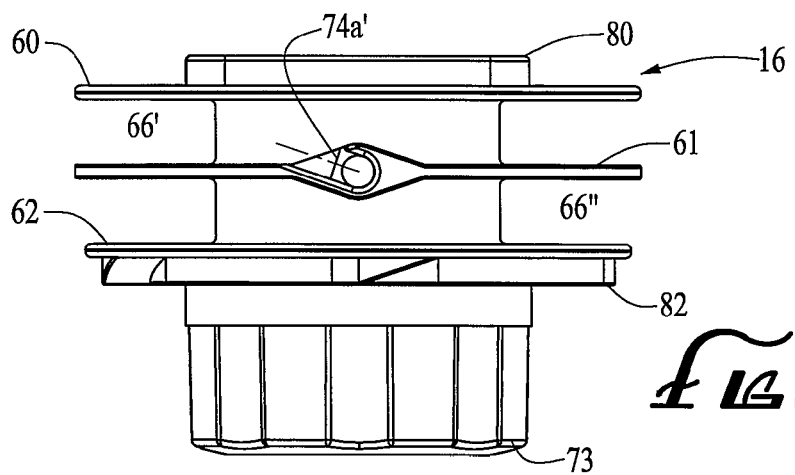
FIG. 14B is a front view of the spool of the trimmer head shown in FIGS. 1-6C as viewed from the left side of FIG. 14A.
Figure 14C:
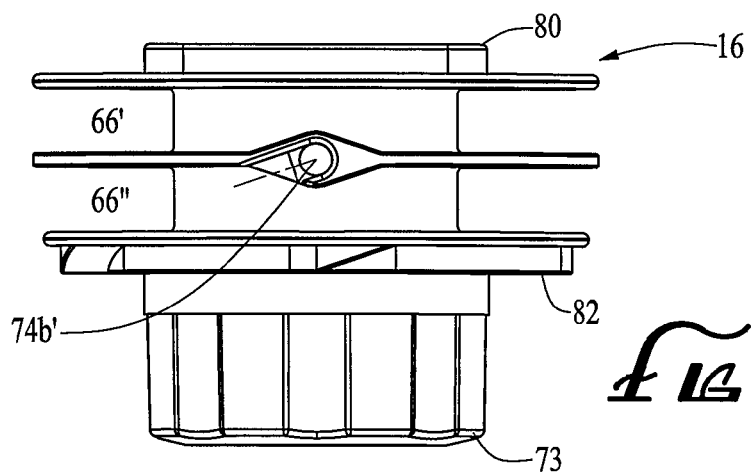
FIG. 14C is a rear view of the spool of the trimmer head shown in FIGS. 1-6C as viewed from the right side of FIG. 14A.

To assist in the winding of the cutting line 17 on to the spool 16 such that the portions of the line projecting from each of the two eyelets is drawn back into separate spool storage areas 66' and 66" and wrapped about the spool as illustrated in FIG. 6C, the opposed ends 74a and 74b of the line receptor channel are configured by the middle spool flange 61 to direct the opposed portions of the line into different spool areas. This can be accomplished by removing portions of the channel wall defined by flange 61 adjacent the two channel ends such that lateral openings 74a' and 74b' are formed in the side wall, communicating channel end 74a with area 66' and channel end 74b with area 66" as shown in FIGS. 14A-14C. By rotating the spool in a clockwise direction while holding the housing stationary with the head in an inverted position (i.e., with the lower spool end 73 facing upwardly), the portion of the trimmer line 17 projecting from the open end 74a of the line receptor is directed into the upper spool storage area 66' and the portion of the trimmer line projecting from channel end 74b is directed into the lower line storage area 66" (see FIG. 14C). Other guide surface configurations could also be employed to direct the opposing line portions into the different spool chambers or storage areas 66' and 66". Printed indicia such as directional arrows 100 (see FIG. 20) are preferably provided on the lower housing 14b to indicate the direction of rotation of the spool with respect to the housing to effect the winding of the line onto the spool.

Figure 21:
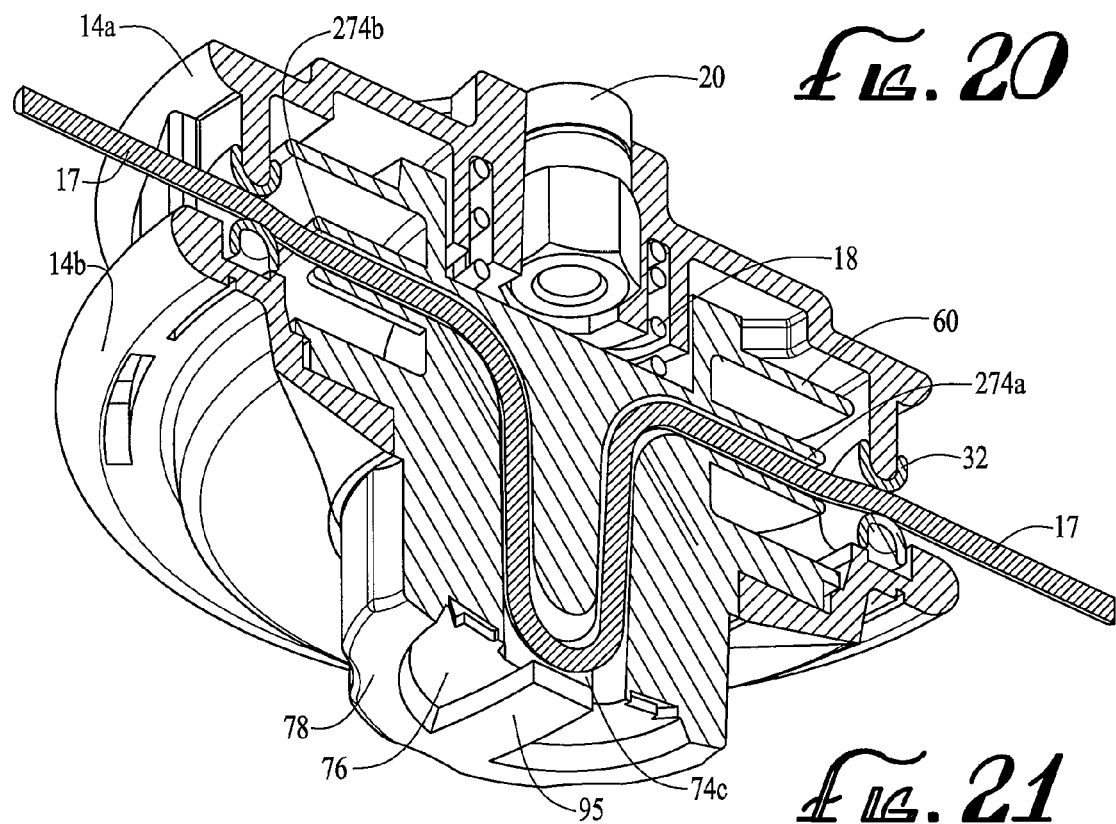
FIG. 21 is a cross-sectional view of a trimmer head of the present invention illustrating the use of a protective bridge extending over the open portion of the line receptor channel in the bottom of the spool.

By recessing the portion 76 of the lower end of the spool through the exposed portion 74c of the line receptor channel extends, the exposed line is protected when the rapidly rotating head is bumped against the ground to pay out fresh lengths of line through the eyelets 32. If desired, additional protection can be afforded by, for example, a protective bridge 95 as shown in FIG. 21, a removable cap (not shown) or other protective element that will allow the user to access the trimmer line extending thereover in channel portion 74c. Such a protective element may be particularly desirable for use on abrasive terrain such as gravel.

When the spool 16 is gripped by the lower body portion of the spool 72 and rotated relative to the housing as described above, the lower slide surfaces 82b on the lower cam follower 82 will abut the trailing surfaces 58b on the lower projections 58 causing the spool to translate upwardly with respect to the housing, compressing the coil spring 18. As the manual rotation of the spool continues, the corner portions of the lower cam follower 82 can ride over and clear the projections 58 in the lower portion of the housing whereupon the spring causes the spool to snap downwardly such that the lower projections and lower cam abutment surfaces are again in planar alignment. Thus, this reciprocating movement of the rotating spool, which, although not necessary, is preferably employed in the present invention to provide for an even distribution of the cutting line in the two storage areas 66' and 66" about the upper body of the spool. As a result, the lengths of line tend to roll over themselves and fill the two spool areas without becoming entangled on the spool. Because the upper slide surfaces on the upper projections 44 and the leading (slide) surfaces 80b on the upper cam follower 80 are in abutment, it may prove desirable to incline the trailing surfaces 44b of the upper projections 44 and/or the leading (slide) surfaces 80b of the upper cam follower 80 to provide smoother rotation of the spool with respect to the housing during the loading of the line.

It is to be understood that the line loading and removal features of the present invention could be provided in a rotary trimmer head without the reciprocating feature provided by the sliding surfaces (e.g. 58*b* and 82*b*) in the operative connection between the spool and the housing. Alternatively, other means of effecting such linear, reciprocal movement during the winding of the line about the spool could be employed.

The above description of the trimmer head 10 and its components is based on using the head on a conventional rotary trimmer in which the gear box (not shown) typically imparts a counterclockwise rotation to the drive shaft 12 and thus to the trimmer head. If the head were used on a trimmer without a gear box or with one that imparted a clockwise rotation to the head, the leading and trailing surfaces on the cams and cam follower abutment members would simply be reversed. Accordingly, the orientation of the cam features and slide surfaces could be reversed to accommodate a rotary trimmer in which the gear box imparts a clockwise rotation to the drive shaft 12.

The bump-feed mechanism provided by the cams and cam abutment surfaces need not be limited to square cam followers. The same is true of trimmer head 10. The upper and lower cam followers formed by upper and lower portions of the spool, for example, could be three or five sided. Three and five sided cam followers would cooperate with an equal number of cam abutment members in the upper and lower housings as shown in the referenced drawings. The function, cooperation and operation of such cams and cam followers would be otherwise essentially unchanged from that described above.

In the embodiment of the spool employed in the trimmer head shown in FIGS. 1-6C and illustrated therein and in FIGS. 11A-12C, the line receptor channel 74 in spool 16 is formed by affixing a pair of channel forming inserts 90 in the interior of the spool. Spool 16 is preferably formed by an injection molding process and by using inserts 90 to form the line receptor channel 74, the cost of manufacturing the spool is substantially reduced. Alternately, the same channel configuration could be obtained without the need for inserts 90 in a single-piece construction, albeit at a substantially higher cost. Such a spool 16' is illustrated in FIG. 12D. Other than its method of manufacture, spool 16' is substantially identical to spool 16. In the spool 16 (see, e.g. FIGS. 3 and 12A) a pair of generally rectangular aligned slots 92 are provided in the interior of the spool. The slots 92 are configured to receive inserts 90 such that the end surfaces of the slots cooperate with inner end surfaces on the inserts to define the portions of the line receptor channel 74 disposed with the body of the spool. In the embodiment shown in the drawings, each insert 90 defines an upper concave end surface 91' that merges along a curvilinear end surface 91" into a substantially vertical concave end surface 91'''. Upon affixing inserts 90 in slots 92, the concave end surfaces 91'-91''' of the inserts and the adjacent interior surfaces of the spool thus define surrounding wall for the interior portions of the line receptor channel 74. The inserts 90 and the spool 16 are preferably both formed of a nylon 6 copolymer, although other materials could be used. Currently, the inserts 90 are formed separately from and prior to the spools to allow for a natural shrinkage thereof. The inserts are then inserted into the freshly molded spool in a relatively tight fitment such that the natural shrinkage of the spool following its formation lock the inserts in place. Adhesives and other attachment means also could be used and, as noted above and illustrated in FIG. 12D, the spool could alternatively be molded of a single-piece construction.

In the event that the cutting line were to break during use proximate one of the eyelets 32, the trimmer line inwardly adjacent the break retracts into the head so that additional fresh line cannot be payed out by simply bumping the head on the ground. With the present invention, the user can grasp the portion of the cutting line extending across the open or exposed portion 74*c* of the line receptor channel 74 and pull the line downwardly as illustrated in FIGS. 15B and 15C. The downward pulling on the line in a direction parallel, if not coincident to the axis of rotation of the spool, will effect an unraveling of the line off the spool, allowing all of the line to be pulled downwardly from the spool through the laterally-spaced openings 74' and 74" in the bottom of the spool. Thus, the old line can be removed from the trimmer head without having to split the head (remove the spool from the housing) or otherwise interrupt the operative connection between the spool and the housing. The removed line or a new length of fresh line can then be re-loaded onto the head using the line receptor channel as earlier described, again without having to split the head.

The cross section of the receptor channel 74 is illustrated as being generally cylindrical, except for the open exposed portion 74*c* thereof. It is to be understood, however, that the cross-section of the channel could have other geometries that will accommodate the line and assist with the guidance of the cutting line through the spool. For example, a line receptor channel 86 having an oval, square, triangular, or any other similar cross-sectional geometry, could be used in place of the circular cross-section described above for the first embodiment of the spool 16. The size of the receptor channels depends on the diameter and geometry of the line to be passed therethrough and the line receptor channel 74 could be dimensioned and shaped so as to accommodate any such cutting line 17. For example, by sizing the channel 17 such that it defines a diameter of about 0.210 in., the trimmer head 10 can accommodate all standard cutting line sizes, i.e., 0.050-0.155 in. diameter line. Small models designed solely for the consumer market may be configured to hold only 0.050-0.080 in. diameter line.

Figure 16:
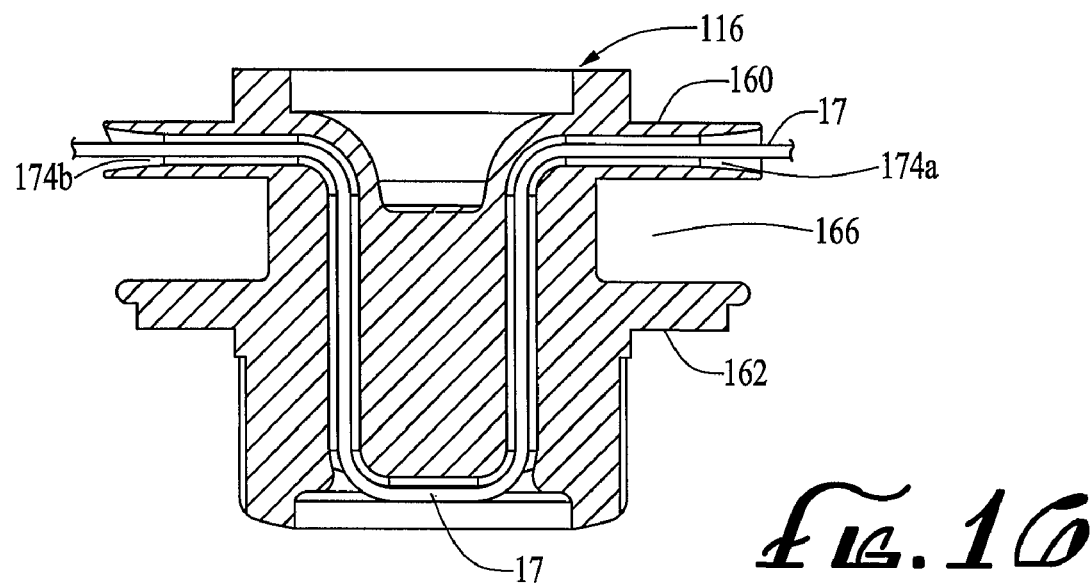
FIG. 16 is a perspective, sectional view of an alternate embodiment of a spool for use in the present invention.

The spools illustrated in FIGS. 1-15C are dual area spools in which the portion of the line extending from one eyelet is wrapped about one area of the spool or spool chamber (e.g. 66') and the portion of the cutting line exiting another eyelet is wrapped about another of the spool (e.g. 66"). It is to be understood that the present invention could also be employed with a single chamber spool such as that illustrated in FIG. 16. In that embodiment, the line receptor channel openings 174*a* and 174*b* are defined by the upper flange 160. Flange 160 cooperates with a lower flange 162 to form a single line storage area 166 and the spool 116 is configured relative to the housing (not shown) such that the opposed line receptor channel openings in flange 160 are radially aligned with the housing eyelets (not shown). Spool 116 defines the same cam and cam follower surfaces as spool 16 and cooperates in the same manner as spool 16 with its associated upper and lower housings. Spool 116 could be manufactured as a single piece as shown in FIG. 16 or with inserts like spool 16. If desired, a trimmer head also could be constructed in accordance with the present invention employing two separate lengths of cutting line and four perpendicularly disposed eyelets in the annular housing skirt (not shown). Such a trimmer head may employ two separate and preferably perpendicularly disposed line receptor channels and a spool having five vertically spaced flanges so as to define four spool chambers or line storage areas. One of the line receptor channels preferably would feed the line into the upper two storage areas and the second channel would feed the line into the lower two line storage areas.

Figure 17:
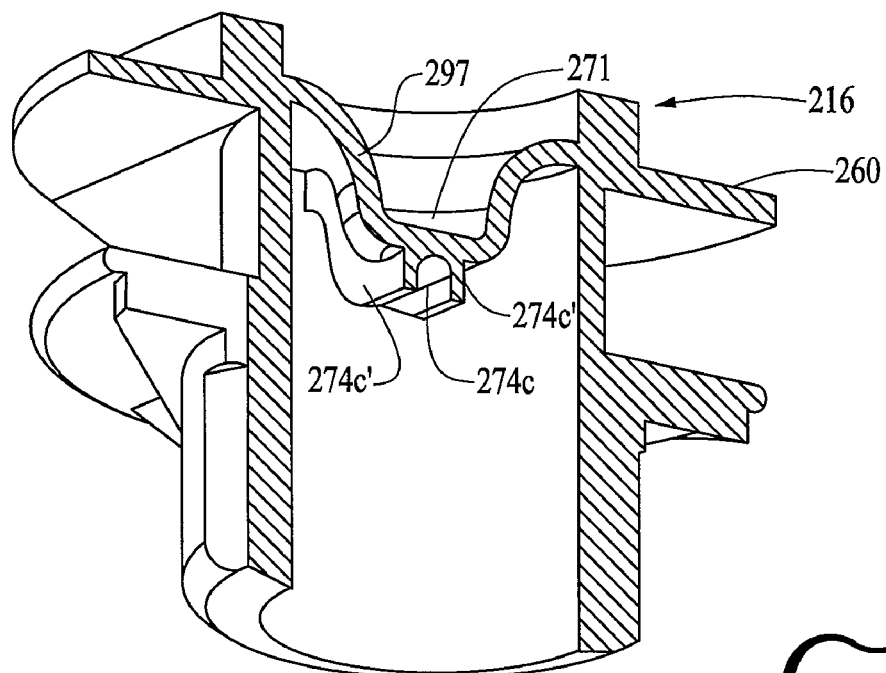
FIG. 17 is a cross-sectional perspective view of another alternate embodiment of a spool for use in the present invention.
Figure 18:
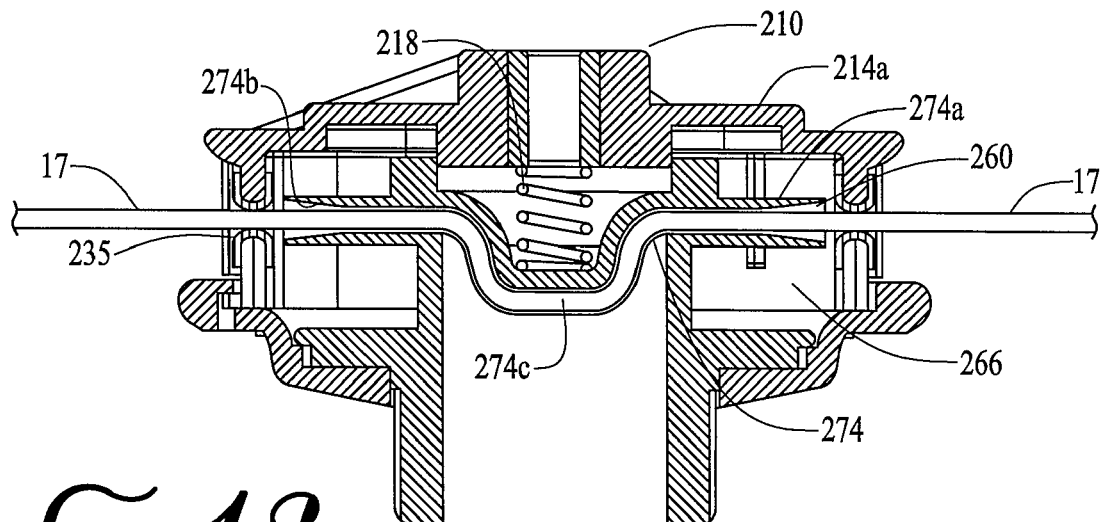
FIG. 18 is a cross-sectional view of an alternate embodiment of a trimmer head of the present invention employing the spool shown in FIG. 17 and illustrating the cutting line extending through the line receptor channel prior to being wound about the spool.
Figure 19:
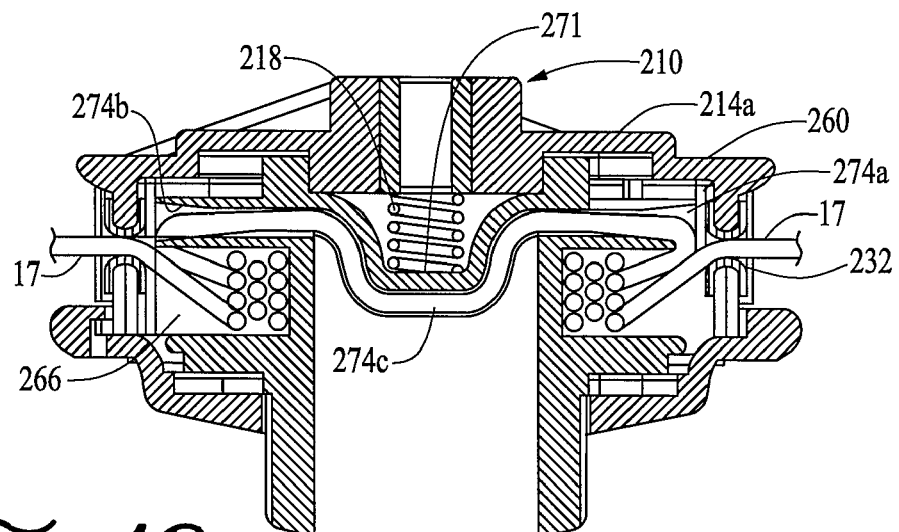
FIG. 19 is a cross-sectional view of the trimmer head illustrated in FIG. 18 with the cutting line having been wound about the spool.
Figure 20:
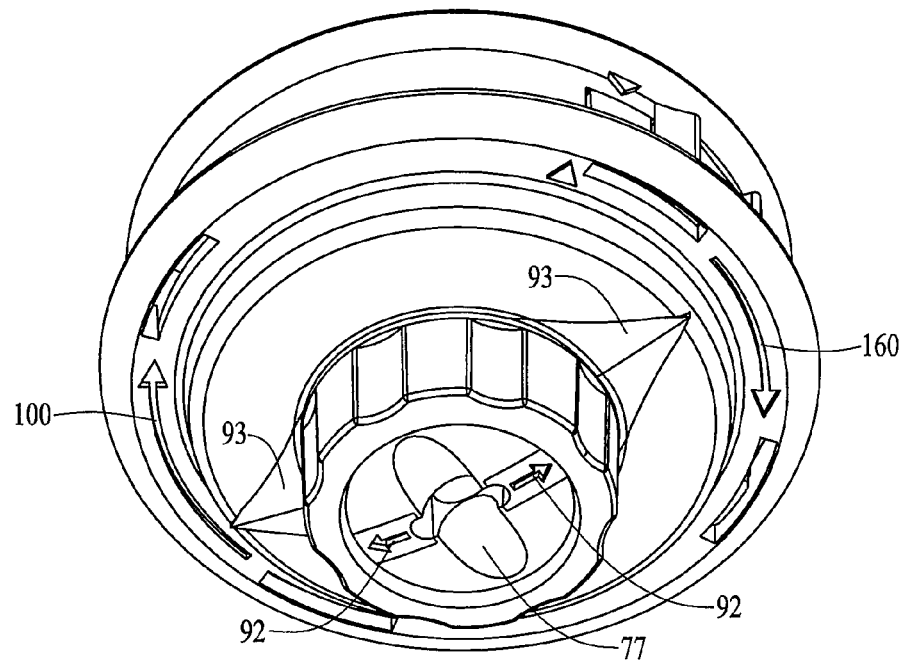
FIG. 20 is an enlarged perspective view of the trimmer head shown in FIGS. 1-6C as seen from below and illustrating indicia adjacent the underside of the lowermost end of the spool for aligning the line receptor channel in the spool with the opposed eyelets in the depending annular skirt of the upper housing and indicia on the lower housing for indicating the direction of rotation of the spool relative to the housing during the winding of the cutting line onto the spool.

FIGS. 17-19 illustrate an example of a trimmer head 210 and spool 216 in which the open accessible portion 274c of the line receptor channel 274 is further recessed within the interior of the spool 216. Spool 216 is shown to contain a single line storage area 266 although multiple storage areas could again be employed. The channel openings 274a and 274b are defined by the upper flange 260 and are axially aligned with the eyelets 232 in the skirt of the upper housing 214a. The portion 274c of the line receptor channel that traverses the interior cylindrical wall of the spool is open and inverted generally u-shaped configuration (see FIG. 17) and is disposed within the upper half of the spool as seen in the drawings. By so positioning the open portion of the line receptor channel, the channel can be carried by the underside of curvilinear support member 297, the upper surface of which defines the lower abutment surface 271 for spring 218. In addition, the side walls 274c' of the open portion 274 of the line receptor channel, which are preferably more pronounced in this embodiment of the spool than in spool 16, define guide surfaces for directing the cutting line through the interior of the spool 216. While such a configuration provides excellent protection for the exposed portion of the cutting line during use due to its recessed location, access to the exposed portion is more difficult than with the previously discussed embodiments and may require the use of a tool to extract the exposed portion of the line from the walled channel portion 274c. Nevertheless, it still would not be necessary to split the head in order to replace and load the cutting line on head 210. To avoid a collection of dirt and debris within the interior of the spool 216, it may be desirable to provide the lower end of the spool with a removable closure cap (not shown). It should also be noted that the elevation of the open portion 274c of the line receptor channel in the spool could be varied. By lowering the positioning of the open line portion, access to the cutting line therein could be enhanced.

Figure 22:
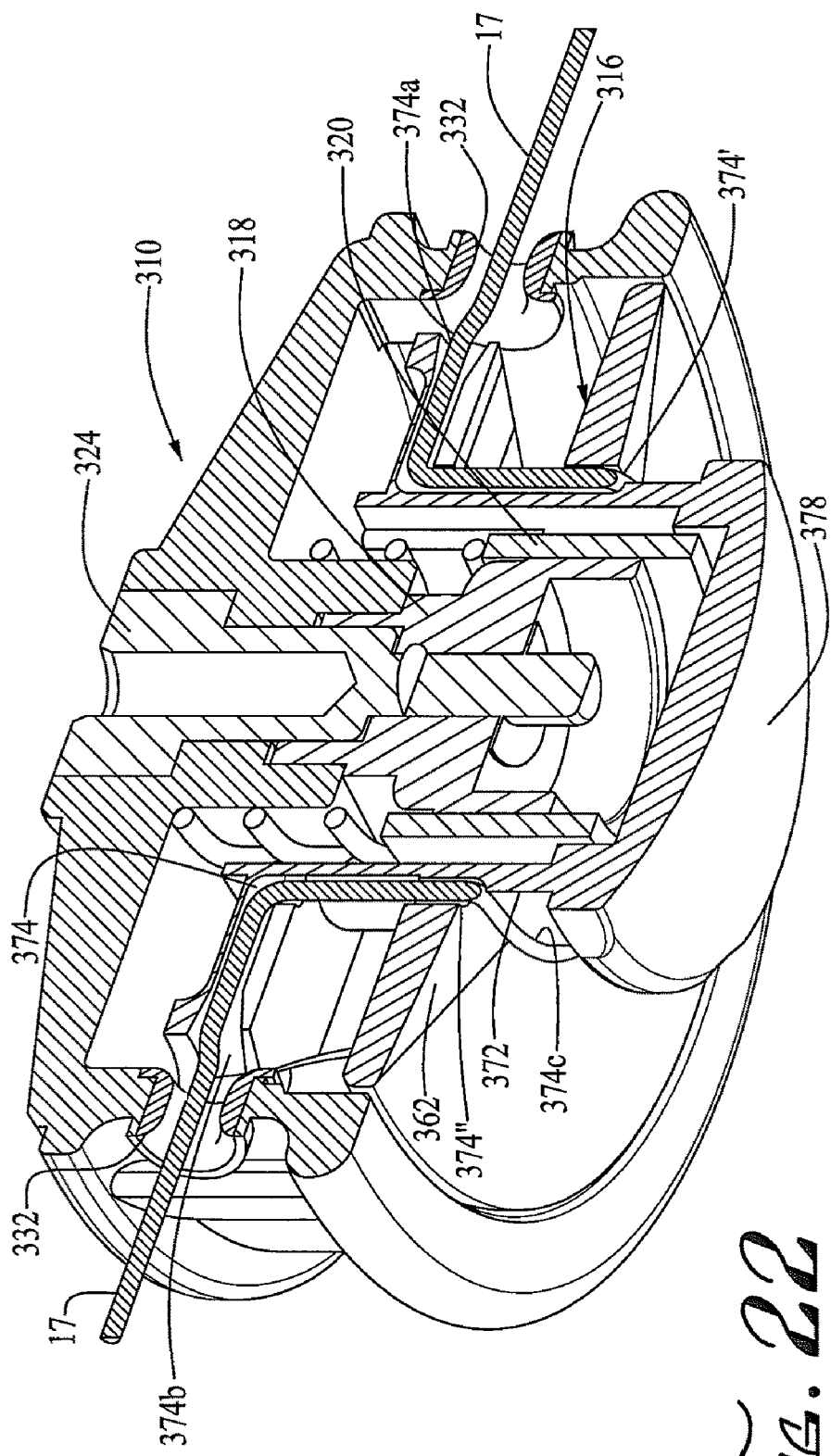
FIG. 22 is a cross-sectional perspective view of an alternate embodiment of a bump-feed type head embodying the present invention.

Another example of recessing the open portion of the line receptor channel within the interior of the spool is illustrated in FIG. 22. This embodiment illustrates the use of the present invention in a bump-feed type trimmer head 310 employing the cam and cam follower arrangement for effecting the feed out of the line and reciprocal relative movement of the spool and housing during line winding that is disclosed in the first embodiment of the trimmer head illustrated in FIGS. 1-15 in patent application Pub. No. U.S. 2005/0076515 A1, filed Sep. 3, 2004 and entitled "Trimmer Head for Use in Flexible Line Rotary Trimmers Having Improved Loading Mechanism," the teachings of which have been incorporated herein by reference.

As seen in FIG. 22, the drive bolt 324, the cam member 318 threadably secured thereto and the surrounding cam follower 320 obstruct the interior of the spool 316. As a result, there is little room to extend the cutting line through and across the spool interior in an exposed and accessible disposition. Accordingly, in trimmer head 310, the line receptor channel 374 extends inwardly from the opposed channel openings 374a and 374b, through the lower flange 362 and downwardly through opposed portions of the spool, exiting the spool 316 at openings 374' and 374" adjacent the outer surface of the spool body 372 and above the ground engaging or bumper surface 378 at the lower end of the spool. The exposed portion 374c of the line receptor channel extends between the channel openings 374' and 374", preferably about the outer surface of the spool body and adjacent the underside of the lower spool flange 362 as shown in FIG. 22. Channel portion 374c is preferably defined by a trough or other concavely curved channel surface to assist in guiding the line about the spool body and holding the exposed and accessible portion of the cutting line 17 in place.

The loading of the cutting line 17 onto head 310 and the removal of the line for replacement by pulling downwardly on the exposed portion of the line in channel portion 374c is substantially identical to the trimmer head configurations discussed above. The line can be loaded onto the head by threading one end thereof through one of the eyelets 332, through the adjacent portion of the line receptor channel and out one of the channel openings 374' or 374" in the end interior of the spool. The line is then inserted back up through the other opening 374" or 374' and through the other half of the channel and out the other end and aligned eyelet. The line is then pulled through the head until the midpoint thereof extends about exposed channel 374c. The spool is then rotated with respect to the housing to wrap the line about the spool in the same manner as in the prior embodiments. Again, the line could have been loaded onto the head by initially inserting the extended end portions upwardly through channel openings 374' and 374", about the opposed portions of the channel 374 and out through the openings 374a and 374b and the aligned eyelets. As described in detail in the referenced published application, the cam member 318, and cam follower 320 form the operative connection between the spool and the housing and effect reciprocal movement of the spool with respect to the housing during the manual winding of the line onto the housing, providing an even distribution about the trimmer line on the spool 316. To remove the cutting line from the head, the user need only pull downwardly on the exposed portion of the line in channel portion 374c. While spool 316 is illustrated as a single chamber spool, a dual chamber spool could be employed, if desired.

Figure 23:
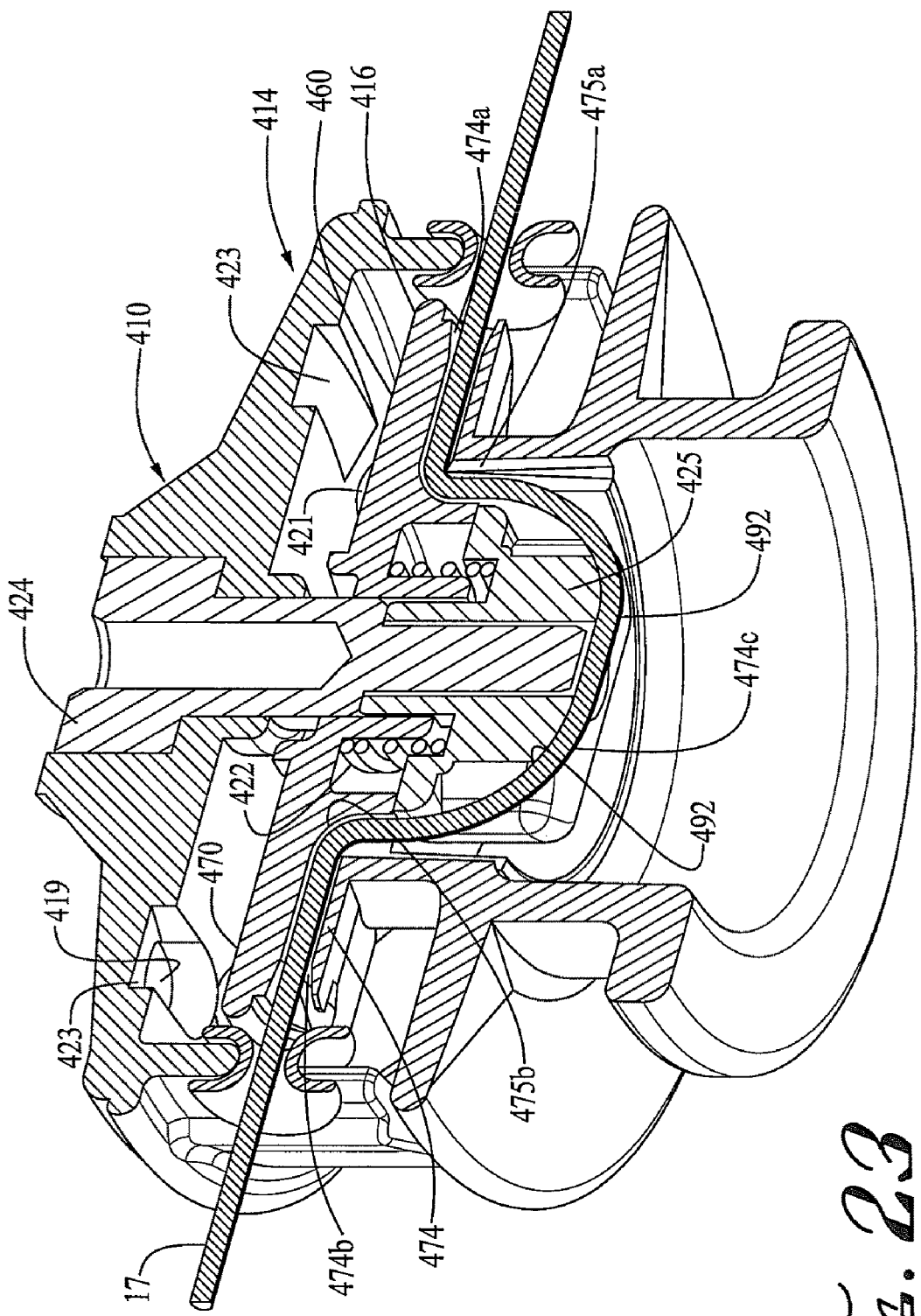
FIG. 23 is a cross-sectional perspective view of a manual feed trimmer head embodying the present invention.

FIG. 23 illustrates the use of the present invention in a manual feed head similar to that disclosed in the second embodiment of the above-referenced Publication No. U.S. 2005/0076515 A1 and illustrated in FIGS. 20-31 therein. In the manual feed head 410 shown in FIG. 23, the spool 416 is secured to the trimmer head housing 414 by a threaded nut 425 that threadably engages the drive bolt 424. The operative connection is defined by a plurality of drive lugs 421 extending upwardly from the upper surface of the upper flange 470 (only a portion of one lug being visible in FIG. 23), a corresponding plurality of lug receiving apertures 419 in the upper surface of the trimmer head housing 414. The drive lugs are held within the receiving apparatus by nut 425, compressing spring 422. As described in detail in the referenced published application, rotation of the trimmer head housing 414 by the drive bolt 424 is imparted to the spools via drive lugs 421.

The line receptor channel 474 in head 410 extends inwardly from the opposed channel openings 474a and 474b in the upper flange 460 of spool 416 and about curvilinear surfaces 475a and 475b defined by the spool, downwardly into the interior of the spool and about the spool securement nut 425. A concave guide channel 492 is preferably provided in the lower end and lower side wall portions of the securement nut to guide the cutting line about the nut and help hold the exposed portion of the cutting line extending thereover in place during line loading. Through such a configuration, the line can be removed from the spool without having to split the head as in the prior embodiments.

So that the head 410 can also be loaded with line without having to split the head, the interior surface of the upper wall of the trimmer head housing 414 is provided with a plurality of arcuate inclined ramps 423. One ramp is adjacent and extends in an arcuate path from each lug receiving aperture 419 toward the next aperture at a downward inclination so that upon holding the head in an inverted disposition (with respect to FIG. 23), gripping the lower body portion of the spool and rotating the spool with respect to the housing in a clockwise direction, the drive lugs will translate from aperture to aperture along the ramps to wind the line about the spool and concurrently effect the desired reciprocal movement of the spool within the housing to provide the uniform distribution of the cutting line about the spool as the line is wound onto the spool. Thus, the cutting line can be removed from and replaced on the manual head in the same manner as with the bump-feed heads described above. To pay out fresh cutting line 17 from the spool in trimmer head 410, the user, with the drive motor turned off, pulls upwardly on the spool with respect to the housing with the head inverted (with respect to FIG. 23) such that the lower end of the spool faces upwardly, disengaging the drive lugs 421 from the lug receiving apertures 419. The user then manually rotates the spool relative to the housing with the drive lugs disengaged in a counterclockwise direction, allowing fresh uncoiled line to be pulled from the spool through the opposed eyelets.

In addition to bump-feed and manual feed type heads, the present invention can also be employed on an automatic head of the type that includes a mechanism for automatically paying out additional line by causing relative rotation between the spool and the housing whenever the length of line extending from the head into the cutting plane is less than a predetermined length. Such heads typically rely on a balance of forces generated by the rotating head and line to detect a severing of the extending line and effect the pay out of additional fresh cutting line. An example of such an automatic head is found in U.S. Pat. No. 5,063,673. While not illustrated herein, such a cutting head could be adapted for use with the present invention by configuring the spool and housing such that the lower portion of the spool extends downwardly through the bottom of the housing, with the upper spool flange radially aligned with the opposed line outlet apertures or eyelets in the trimmer head housing and providing a line receptor channel extending through the upper spool flange downwardly through opposed portions of the spool body and outwardly through opposed apertures in the lower end of the spool. The lower end of the spool could be configured similar to spool 16 such that an open exposed portion of the line receptor channel would extend through a recessed portion in the lower end of the spool. The resulting configuration would allow line to be removed from and replaced on the spool without the need to split the head.

In the aforesaid embodiments of the invention, the line receptor channels extend radially inwardly through a spool flange, extend downwardly from the flange in opposed portions of the spool body and transversely in an open and accessible disposition across a lower end portion of the spool, the interior of the spool or about an external portion of the spool. In the event that a trimmer head were configured such that the spool projected upwardly through the housing as in U.S. Pat. No. 6,952,877, such a head could also be adaptable for use with the present invention. The spool would be modified such that tube or post 66 through the center of the spool could be eliminated and the spool and core member 25 combined in a single-piece construction to provide sufficient material within which to locate the opposed vertical portions of the line receptor channel. The line receptor channel would again extend radially inwardly through opposed portions of a spool flange, radially alignable with the outlet openings in the housing, and then turn upwardly through opposed portions of the spool body, exiting the spool body through opposed openings therein above the upper surface of the housing cover 36 and extending therefrom about the exposed upwardly extending spool portion in a manner similar to channel portion 374c illustrated in FIG. 22 herein, albeit in an inverted disposition.

Thus, the present invention can be employed in a wide variety of trimmer head types and configurations. Various other changes and modifications also may be made in carrying out the present invention without departing from the spirit and scope thereof. For example, the spools employed with the present invention could be formed with a single flange and the line would be wound about the spool body between that flange and a portion of the housing. The line receptor or receptors would continue to be provided in the single flange. Insofar as these and other changes and modifications are within the purview of the appended claims, they are to be considered as part of the present invention.

What is claimed is:

1. A trimmer head for use with a length of flexible cutting line in a flexible line rotary trimmer, said head comprising:
   a housing adapted to be operatively connected to a rotary trimmer to effect rotation of the head, said housing defining a cylindrical depending skirt having opposed line openings therein; and
   a spool for carrying a length of cutting line thereon, said spool being operatively connected to said housing for rotation therewith about a common axis, said spool including a cylindrical body portion, at least one flange projecting radially therefrom so as to define at least one cutting line storage area about said body portion adjacent said flange and a line receptor channel traversing said spool, said channel defining opposed open ends radially alignable with said line openings in said housing skirt upon relative rotation of said spool and said housing and an open portion intermediary of said opposed open ends so as to provide access to said channel intermediary of said open ends with said spool operatively connected to said housing, enabling a user to insert a length of cutting line through said receptor channel and the aligned openings in the housing skirt and wrap the length of line about the spool without having to interrupt the operative connection between the spool and the housing, and in the event of a line breakage proximate one or both of said line openings in the housing skirt, the user can grip and pull on the line in the open portion of said channel in a direction away from said spool and generally parallel to said common axis whereby the cutting line on said spool is pulled from the head for replacement without having to interrupt the operative connection between the spool and the housing.

2. The trimmer head of claim 1 wherein said line receptor channel extends radially through opposed portions of said flange.

3. The trimmer head of claim 1 wherein said open ends of said line receptor channel are disposed in opposed portions of said flange.

4. The trimmer head of claim 1 wherein the operative connection between said spool and said housing effects relative reciprocal movement between said spool and said housing along said common axis of rotation upon rotation of said spool with respect to said housing in a first direction such that upon inserting a length of flexible cutting line through said receptor channel and the aligned line openings in the housing skirt such that substantially equal lengths of line project through said openings from said housing and then rotating said spool with respect to said housing in said first direction, portions of the line projecting from said head are pulled inwardly through said openings in said housing skirt toward said body portion of said spool and are wound about said body portion as said spool is concurrently rotated and reciprocated with respect to said housing.

5. The trimmer head of claim 4 wherein said line receptor channel extends radially through opposed portions of said flange.

6. The trimmer head of claim 4 wherein said open ends of said line receptor channel are disposed in opposed portions of said flange.

7. The trimmer head of claim 1 including means for effecting relative reciprocal movement between said spool and said housing along said common axis of rotation upon rotation of said spool with respect to said housing in a first direction such that upon inserting a length of flexible cutting line through said receptor channel and the aligned line openings in the housing skirt such that substantially equal lengths of line project through said openings from said housing and then rotating said spool with respect to said housing in said first direction, portions of the line projecting from said head are pulled inwardly through said openings in said housing skirt toward said body portion of said spool and are wound about said body portion as said spool is concurrently rotated and reciprocated with respect to said housing.

8. The trimmer head of claim 7 wherein said line receptor channel extends radially through opposed portions of said flange.

9. The trimmer head of claim 7 wherein said open ends of said line receptor channel are disposed in opposed portions of said flange.

10. The trimmer head of claim 1 wherein said spool defines a lower ground engagement surface and at least a portion of said open portion of said line receptor channel traverses a lower portion of said spool proximate said ground engagement surface.

11. The trimmer head of claim 10 including relief areas in said spool adjacent said open portion of said channels to facilitate the gripping of cutting line extending along the open portion of said channel.

12. The trimmer head of claim 1 wherein said spool defines a lower ground engagement surface and said open portion of said line receptor channel is recessed in the spool with respect to said surface.

13. The trimmer head of claim 1 wherein said line receptor channel extends radially inwardly from said opposed open ends thereof, downwardly along opposed portions of the body portion of the spool and transversely of said body portion, at least a portion of the channel extending transversely of said body portion of the spool defining said open portion of said channel.

14. The trimmer head of claim 1 wherein said line receptor channel extends radially inwardly from said opposed open ends thereof, upwardly along opposed portions of the body portion of the spool and transversely of said body portion, at least a portion of the channel extending transversely of said body portion of the spool defining said open portion of said channel.

15. The trimmer head of claim 1 wherein portions of said line receptor channel extend radially inwardly from said opposed open ends thereof and downwardly along opposed portions of the body portion of the spool and wherein said inwardly and downwardly extending portions are defined by surrounding annular walls, said walls defining guide surfaces for guiding the cutting line through said spool.

16. The trimmer head of claim 13 wherein said spool defines a lower ground engagement surface and said open portion of said line receptor channel extends along at least a portion of said spool proximate said ground engagement surface and including relief areas in said spool adjacent said open portion of said channel to facilitate the gripping of cutting line extending along the open portion of said channel.

17. The trimmer head of claim 13 wherein said spool defines a lower ground abutment surface and said open portion of said channel is recessed in the spool with respect to said surface.

18. The trimmer head of claim 1 wherein the operative connection between said spool and said housing comprises a plurality of equiangularly spaced projections on either said spool or said housing and a corresponding plurality of apertures formed in either said housing or said spool for receiving said projections, each of said apertures defining a leading wall portion and a trailing wall portion, said leading wall portions having a greater axial length than said trailing wall portions, a spring member urging said projections into said apertures such that rotation of said head in a first direction causes said projections to bear against said leading wall portions of said apertures and effect corresponding rotation of said spool in said first direction, and a corresponding plurality of inclined arcuate ramps, each of said ramps extending from a location proximate one of said apertures in an arcuate inclined path to a trailing wall surface of another of said apertures such that as said spool is rotating with respect to said housing in said first direction, said projections repeatedly ride over said trailing wall portions of said apertures, along an adjacent inclined ramp and, under the force of said spring member into another aperture so as to cause a reciprocating movement of said spool with respect to said housing along said common axis.

19. The trimmer head of claim 1 wherein the operative connection between said spool and said housing comprises vertically aligned, similarly shaped and rotationally offset upper and lower cams operatively connected to said housing for rotation therewith, each of said cams defining a plurality of cam surfaces thereon, and a cam follower assembly operatively connected to said spool for rotation therewith and defining a plurality of cam abutment surfaces adapted to selectively engage said cam surfaces in predetermined rotational increments in response to the striking of said head on the ground so as to cause the spool to translate vertically within the housing while said head and said spool are rotating in a first direction, whereby relative rotation is produced between said spool and said housing to effect the feeding of predetermined amounts of line outwardly through said line openings in said housing skirt, and wherein at least one of said cams and said cam follower assembly define a sliding surface adjacent and angularly offset with respect to each of said cam surfaces and said cam abutment surfaces thereon so as to allow said spool to be rotated in said first direction with respect to said housing and effect the reciprocating movement of said spool with respect to said housing as said line is wound on said spool.

20. A trimmer head for use with a length of flexible cutting line in a flexible line rotary trimmer, said head comprising:
   a housing adapted to be operatively connected to a rotary trimmer to effect rotation of said head, said housing defining a cylindrical depending skirt having a plurality of line outlet openings therein;
   a spool for carrying a length of cutting line thereon, said spool being operatively connected to said housing for rotation therewith in a first direction about a common axis in a drive mode and for rotation with respect to said housing in said first direction in a line winding mode, the operative connection between said spool and said housing includes a pair of vertically aligned and rotationally offset cams, each of said cams defining a plurality of spaced cam surfaces thereon and at least one of said cams defining a plurality of slide surfaces adjacent the cam surfaces thereon and a cam follower defining a plurality of spaced cam follower surfaces thereon and a plurality of slide surfaces adjacent said cam follower surfaces, said cam follower surfaces cooperating with said cam surfaces to effect said rotation of said spool with said housing and said slide surfaces on said cam follower cooperating with said slide surfaces on said one cam for effecting said reciprocal movement between said spool and said housing and wherein said spool includes a cylindrical body portion and at least one flange projecting radially therefrom so as to define at least one cutting line storage area about said body portion adjacent said flange, the operative connection between said spool and said housing effecting reciprocal movement between said spool and said housing along said common axis of rotation upon rotation of said spool with respect to said housing in said first direction; and a line receptor channel traversing said spool, said channel defining opposed open ends radially alignable with said line openings in said skirt upon relative rotation of said spool and said housing and an open portion intermediary of said opposed open ends so as to provide access thereto with said spool operatively connected to said housing, enabling a user to insert a length of cutting line through said receptor channel and the aligned openings in the housing skirt and wrap the length of line about the spool without having to interrupt the operative connection between the spool and the housing, and in the event of a line breakage proximate one or more of said line openings in the housing skirt, the user can grip and pull on the line in the open portion of said channel in a direction generally parallel to said common axis whereby the cutting line on said spool is pulled from the head for replacement without having to interrupt the operative connection between the spool and the housing.

21. The trimmer head of claim 20 wherein said line receptor channel extends radially through opposed portions of said flange.

22. The trimmer head of claim 20 wherein said open ends of said line receptor channel are disposed in opposed portions of said flange.

23. The trimmer head of claim 20 wherein said line receptor channel extends radially inwardly from said opposed open ends thereof, downwardly along opposed portions of the body portion of the spool and transversely of said body portion, at least a portion of the channel extending transversely of said body portion of the spool defining said open portion of said channel.

24. The trimmer head of claim 23 wherein said spool defines a lower ground abutment surface and said open portion of said channel is recessed in the spool with respect to said surface.

25. A trimmer head for use with a length of flexible cutting line in a flexible line rotary trimmer, said head comprising:
  a housing adapted to be operatively connected to a rotary trimmer to effect rotation of the head, said housing defining a cylindrical depending skirt having opposed line openings therein; and
  a spool for carrying a length of cutting line thereon, said spool being operatively connected to said housing for rotation therewith about a common axis, said spool including a cylindrical body portion, at least one flange projecting radially therefrom so as to define at least one cutting line storage area about said body portion adjacent said flange and a walled line receptor channel traversing said spool for directing cutting line through said spool, said channel defining opposed open ends radially alignable with said line openings in said housing skirt upon relative rotation of said spool and said housing and wherein portions of said channel extend radially inwardly from said opposed open ends, downwardly along opposed portions of the body portion of the spool and transversely between said downwardly extending portions, at least a portion of the transversely extending portion of said channel being open so as to provide access to said channel with said spool operatively connected to said housing, whereby in the event of a line breakage proximate one or both of said line openings in the housing skirt, a user can grip and pull on the line in the open portion of said channel in a direction away from said spool and generally parallel to said common axis whereby the cutting line on said spool is pulled from the head for replacement without having to interrupt the operative connection between the spool and the housing.

26. The trimmer head of claim 25 wherein said line receptor channel extends radially through opposed portions of said flange.

27. The trimmer head of claim 25 wherein said open ends of said line receptor channel are disposed in opposed portions of said flange.

28. The trimmer head of claim 25 wherein said spool includes an upper flange and a lower flange and said one flange is disposed therebetween and cooperates therewith to define upper and lower cutting line storage areas therebetween about said body portion and wherein said one flange defines first and second guide surfaces, said first guide surface being configured to direct cutting line extending outwardly through one of said opposed open ends of said line receptor channel into said upper cutting line storage area and the other of said guide surfaces being configured so as to direct line extending from the other of said opposed ends of said line receptor channel into said lower storage area.

29. The trimmer head of claim 25 wherein said transversely extending portion of said channel extends about an exterior surface of said cylindrical body portion of said spool.

30. The trimmer head of claim 28 wherein said line receptor channel extends radially through opposed portions of said one flange.

31. The trimmer head of claim 28 wherein said open ends of said line receptor channel are disposed in opposed portions of said one flange.

32. A trimmer head for use with a length of flexible cutting line in a flexible line rotary trimmer, said head comprising:
  a housing adapted to be operatively connected to a rotary trimmer to effect rotation of the head, said housing defining a cylindrical depending skirt having opposed line openings therein; and
  a spool for carrying a length of cutting line thereon, said spool being operatively connected to said housing for rotation therewith about a common axis, said spool including a cylindrical body portion, at least one flange projecting radially therefrom so as to define at least one cutting line storage area about said body portion adjacent said flange and a walled line receptor channel traversing said spool for directing cutting line through said spool, said channel defining opposed open ends radially alignable with said line openings in said housing skirt upon relative rotation of said spool and said housing, enabling a user to insert a length of cutting line through said line receptor channel and the aligned openings in the housing skirt and wrap the length of line about the spool without having to interrupt the operative connection between the spool and the housing and wherein portions of said channel extend radially inwardly from said opposed open ends, downwardly along opposed portions of the body portion of the spool and transversely between said downwardly extending portions, at least a portion of the transversely extending portion of said channel being open so as to provide access to said channel with said spool operatively connected to said housing, whereby in the event of a line breakage proximate one or both of said line openings in the housing skirt, a user can grip and pull on the line in the open portion of said channel in a direction away from said spool and generally parallel to said common axis whereby the cutting line on said spool is pulled from the head for replacement without having to interrupt the operative connection between the spool and the housing.

33. The trimmer head of claim 32 wherein said open ends of said line receptor channel are disposed in opposed portions of said flange.

34. The trimmer head of claim 32 wherein said spool includes an upper flange and a lower flange and said one flange is disposed therebetween and cooperates therewith to define upper and lower cutting line storage areas therebetween about said body portion and wherein said one flange defines first and second guide surfaces, said first guide surface being configured to direct cutting line extending outwardly through one of said opposed open ends of said line receptor channel into said upper cutting line storage area and the other of said guide surfaces being configured so as to direct line extending from the other of said opposed ends of said line receptor channel into said lower storage area.

35. A trimmer head for use with a length of flexible cutting line in a flexible line rotary trimmer, said head comprising:
a housing adapted to be operatively connected to a rotary trimmer to effect rotation of the head, said housing defining a cylindrical depending skirt having opposed line openings therein; and
a spool for carrying a length of cutting line thereon, said spool being operatively connected to said housing for rotation therewith about a common axis, said spool including a cylindrical body portion, at least one flange projecting radially therefrom so as to define at least one cutting line storage area about said body portion adjacent said flange and a line receptor channel traversing said spool, said channel defining opposed open ends radially alignable with said line openings in said housing skirt upon relative rotation of said spool and said housing and wherein a portion of said channel intermediary of said opposed open ends is open so as to provide access to said channel with said spool operatively connected to said housing, whereby in the event of a line breakage proximate one or both of said line openings in the housing skirt, a user can grip and pull on the line in the open portion of said channel in a direction away from said spool and generally parallel to said common axis whereby the cutting line on said spool is pulled from the head for replacement without having to interrupt the operative connection between the spool and the housing.

36. The trimmer head of claim 35 wherein said line receptor channel extends radially through opposed portions of said one flange.

37. The trimmer head of claim 35 wherein the operative connection between said spool and said housing effects relative reciprocal movement between said spool and said housing along said common axis of rotation upon rotation of said spool with respect to said housing in a first direction such that upon inserting a length of flexible cutting line through said receptor channel and the aligned line openings in the housing skirt such that substantially equal lengths of line project through said openings from said housing and then rotating said spool with respect to said housing in said first direction, portions of the line projecting from said head are pulled inwardly through said openings in said housing skirt toward said body portion of said spool and are wound about said body portion as said spool is concurrently rotated and reciprocated with respect to said housing.

\* \* \* \* \*